(12) United States Patent
Raitarovskyi

(10) Patent No.: US 12,393,264 B2
(45) Date of Patent: Aug. 19, 2025

(54) PRIVATE DATA SHARING FOR EXTENDED REALITY SYSTEMS

(71) Applicant: QUALCOMM Incorporated, San Diego, CA (US)

(72) Inventor: Maksym Raitarovskyi, Madrid (ES)

(73) Assignee: QUALCOMM Incorporated, San Diego, CA (US)

(*) Notice: Subject to any disclaimer, the term of this patent is extended or adjusted under 35 U.S.C. 154(b) by 146 days.

(21) Appl. No.: 18/241,072

(22) Filed: Aug. 31, 2023

(65) Prior Publication Data

US 2025/0076964 A1    Mar. 6, 2025

(51) Int. Cl.
| | |
|---|---|
| *G06F 3/01* | (2006.01) |
| *G06F 3/14* | (2006.01) |
| *G06T 7/73* | (2017.01) |
| *G06V 10/77* | (2022.01) |
| *G06V 20/20* | (2022.01) |
| *H04W 76/10* | (2018.01) |

(52) U.S. Cl.
CPC ............ *G06F 3/011* (2013.01); *G06F 3/1454* (2013.01); *G06T 7/74* (2017.01); *G06V 10/7715* (2022.01); *G06V 20/20* (2022.01); *H04W 76/10* (2018.02); *G06F 3/1423* (2013.01)

(58) Field of Classification Search
CPC ... H04W 76/10; G06V 20/20; G06V 10/7715; G06F 3/1454; G06F 3/011; G06F 3/1423; G06T 7/74; G06T 7/246; G06T 7/73; G06T 2207/10028; G06T 2207/10024; G06T 2207/10021; G06T 2207/20084
See application file for complete search history.

(56) References Cited

U.S. PATENT DOCUMENTS

| | | | |
|---|---|---|---|
| 2011/0225069 | A1 | 9/2011 | Cramer et al. |
| 2025/0022162 | A1* | 1/2025 | Fulkerson ............ G06T 19/006 |

FOREIGN PATENT DOCUMENTS

| | | |
|---|---|---|
| CN | 104581987 A | 4/2015 |
| CN | 108490832 A | 9/2018 |
| CN | 108377286 B | 12/2020 |
| CN | 108280641 B | 1/2021 |

\* cited by examiner

*Primary Examiner* — Deeprose Subedi
(74) *Attorney, Agent, or Firm* — Polsinelli LLP /QUALCOMM Incorporated

(57) ABSTRACT

Techniques and systems are provided for performing data transfers. For instance, a process can include receiving an indication to perform a data transfer; determining, based on a feature map of an environment, a location of an extended reality (XR) device in the environment; determining a first pose of the XR device; obtaining, from the feature map, location information for a target device in the environment; identifying the target device based on the location and the first pose of the XR device; transmitting, to the target device in response to the indication to perform the data transfer, a request to initiate the data transfer; receiving a second pose of the target device; and performing the data transfer based on the received second pose and the first pose of the XR device.

28 Claims, 13 Drawing Sheets

PRIVATE DATA SHARING FOR EXTENDED REALITY SYSTEMS

FIELD

This application is related to user interfaces for extended reality (XR) systems. For example, aspects of the application relate to systems and techniques for private data sharing for XR systems.

BACKGROUND

Extended reality (XR) technologies can be used to present virtual content to users, and/or can combine real environments from the physical world and virtual environments to provide users with XR experiences. The term XR can encompass VR, AR, mixed reality (MR), and the like. An XR system or device (e.g., a head-mounted display (HMD), AR or MR glasses, or other device, which can be generally referred to as a headset) can display an XR environment to a user. The XR environment is at least partially different from the real-world environment in which the user is located. The user can generally change their view of the environment interactively, for example by tilting or moving the XR system In some cases, an XR system can include a "see-through" display that allows the user to see their real-world environment based on light from the real-world environment passing through the display. In some cases, an XR system can include a "pass-through" display that allows the user to see their real-world environment, or a virtual environment based on their real-world environment, based on a view of the environment being captured by one or more cameras and displayed on the display. For example, a pass-through XR system can allow a user to experience XR environments by overlaying virtual content onto images of a real-world environment, which can be viewed by a user through the XR system. See-through or pass-through XR systems can be worn by users while the users are engaged in activities in their real-world environment.

In some examples, XR systems allow for new paradigms for controlling and interfacing with interactive objects of the XR system. For instance, rather than using touchscreen or accessories (e.g., mice, keyboards, etc.), which may be bulky or may not translate well to a virtual space, an XR system may be largely controlled by sensors built into the XR system itself. As an example, sensors in an XR system may track a location of objects in the real environment, along with portions of a user of the XR system. The XR systems may then be controlled by movements of portions of the user. As XR systems are rapidly evolving and redefining what is possible with such systems, improved techniques for controlling XR systems may be useful.

SUMMARY

Systems and techniques are described herein for performing private data sharing for XR devices. In one illustrative example, a method for data transfer is provided. The method includes: receiving an indication to perform a data transfer; determining, based on a feature map of an environment, a location of an extended reality (XR) device in the environment; determining a first pose of the XR device; obtaining, from the feature map, location information for a target device in the environment; identifying the target device based on the location and the first pose of the XR device; transmitting, to the target device in response to the indication to perform the data transfer, a request to initiate the data transfer; receiving a second pose of the target device; and performing the data transfer based on the received second pose and the first pose of the XR device.

As another example, an apparatus for data transfer is provided. The apparatus includes at least one memory and at least one processor coupled to the at least one memory and configured to: receive an indication to perform a data transfer; determine, based on a feature map of an environment, a location of the device in the environment; determine a first pose of the device; obtain, from the feature map, location information for a target device in the environment; identify the target device based on the location and the first pose of the device; transmit, to the target device in response to the indication to perform the data transfer, a request to initiate the data transfer; receive a second pose of the target device; and perform the data transfer based on the received second pose and the first pose of the device.

In another example, a non-transitory computer-readable medium is provided. The non-transitory computer-readable medium has stored thereon instructions that, when executed by at least one processor, cause the at least one processor to: receive an indication to perform a data transfer; determine, based on a feature map of an environment, a location of the device in the environment; determine a first pose of the device; obtain, from the feature map, location information for a target device in the environment; identify the target device based on the location and the first pose of the device; transmit, to the target device in response to the indication to perform the data transfer, a request to initiate the data transfer; receive a second pose of the target device; and perform the data transfer based on the received second pose and the first pose of the device.

As another example, an apparatus for data transfer is provided. The apparatus includes: means for receiving an indication to perform a data transfer; means for determining, based on a feature map of an environment, a location of an extended reality (XR) device in the environment; means for determining a first pose of the XR device; means for obtaining, from the feature map, location information for a target device in the environment; means for identifying the target device based on the location and the first pose of the XR device; means for transmitting, to the target device in response to the indication to perform the data transfer, a request to initiate the data transfer; means for receiving a second pose of the target device; and means for performing the data transfer based on the received second pose and the first pose of the XR device.

In another example, a method for initiating a data transfer is provided. The method includes: obtaining, from one or more image sensors, an image of an environment; detecting a visual code in the image; determining the visual code indicates a data transfer is available with a second device; determining a location of a first device; transmitting the location of the first device; receiving an indication to initiate the data transfer, the indication to initiate the data transfer based on the location of the first device being within a data transfer zone of the second device, wherein the data transfer zone is smaller than a region in which the data transfer may occur; and initiating the data transfer based on the indication to initiate the data transfer.

As another example, an apparatus for data transfer by a first device is provided. The apparatus includes at least one memory and at least one processor coupled to the at least one memory and configured to: obtain, from one or more image sensors, an image of an environment; detect a visual code in the image; determine the visual code indicates a data transfer is available with a second device; determine a location of the first device; transmit the location of the first device; receive an indication to initiate the data transfer, the indication to initiate the data transfer based on the location of the first device being within a data transfer zone of the second device, wherein the data transfer zone is smaller than a region in which the data transfer may occur; and initiate the data transfer based on the indication to initiate the data transfer.

In another example, a non-transitory computer-readable medium is provided. The non-transitory computer-readable medium has stored thereon instructions that, when executed by at least one processor, cause the at least one processor to: obtain, from one or more image sensors, an image of an environment; detect a visual code in the image; determine the visual code indicates a data transfer is available with a second device; determine a location of the first device; transmit the location of the first device; receive an indication to initiate the data transfer, the indication to initiate the data transfer based on the location of the first device being within a data transfer zone of the second device, wherein the data transfer zone is smaller than a region in which the data transfer may occur; and initiate the data transfer based on the indication to initiate the data transfer.

As another example, an apparatus for data transfer is provided. The apparatus includes: means for obtaining, from one or more image sensors, an image of an environment; means for detecting a visual code in the image; means for determining the visual code indicates a data transfer is available with a second device; means for determining a location of a first device; transmitting the location of the first device; means for receiving an indication to initiate the data transfer, the indication to initiate the data transfer based on the location of the first device being within a data transfer zone of the second device, wherein the data transfer zone is smaller than a region in which the data transfer may occur; and means for initiating the data transfer based on the indication to initiate the data transfer.

In some aspects, one or more of apparatuses described herein include an extended reality device (e.g., a virtual reality (VR) device, an augmented reality (AR) device, or a mixed reality (MR) device), a mobile device (e.g., a mobile telephone or so-called "smart phone" or other mobile device), a wireless communication device, a vehicle or a computing device, system, or component of the vehicle, a wearable device, a personal computer, a laptop computer, a server computer, a camera, or other device. In some aspects, the one or more processors include an image signal processor (ISP). In some aspects, the apparatus includes a camera or multiple cameras for capturing one or more images. In some aspects, the apparatus includes an image sensor that captures the image data. In some aspects, the apparatus further includes a display for displaying the image, one or more notifications (e.g., associated with processing of the image), and/or other displayable data.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and examples, will become more apparent upon referring to the following specification, claims, and accompanying drawings.

BRIEF DESCRIPTION OF THE DRAWINGS

Illustrative examples of the present application are described in detail below with reference to the following figures.

DETAILED DESCRIPTION

Figure 1:
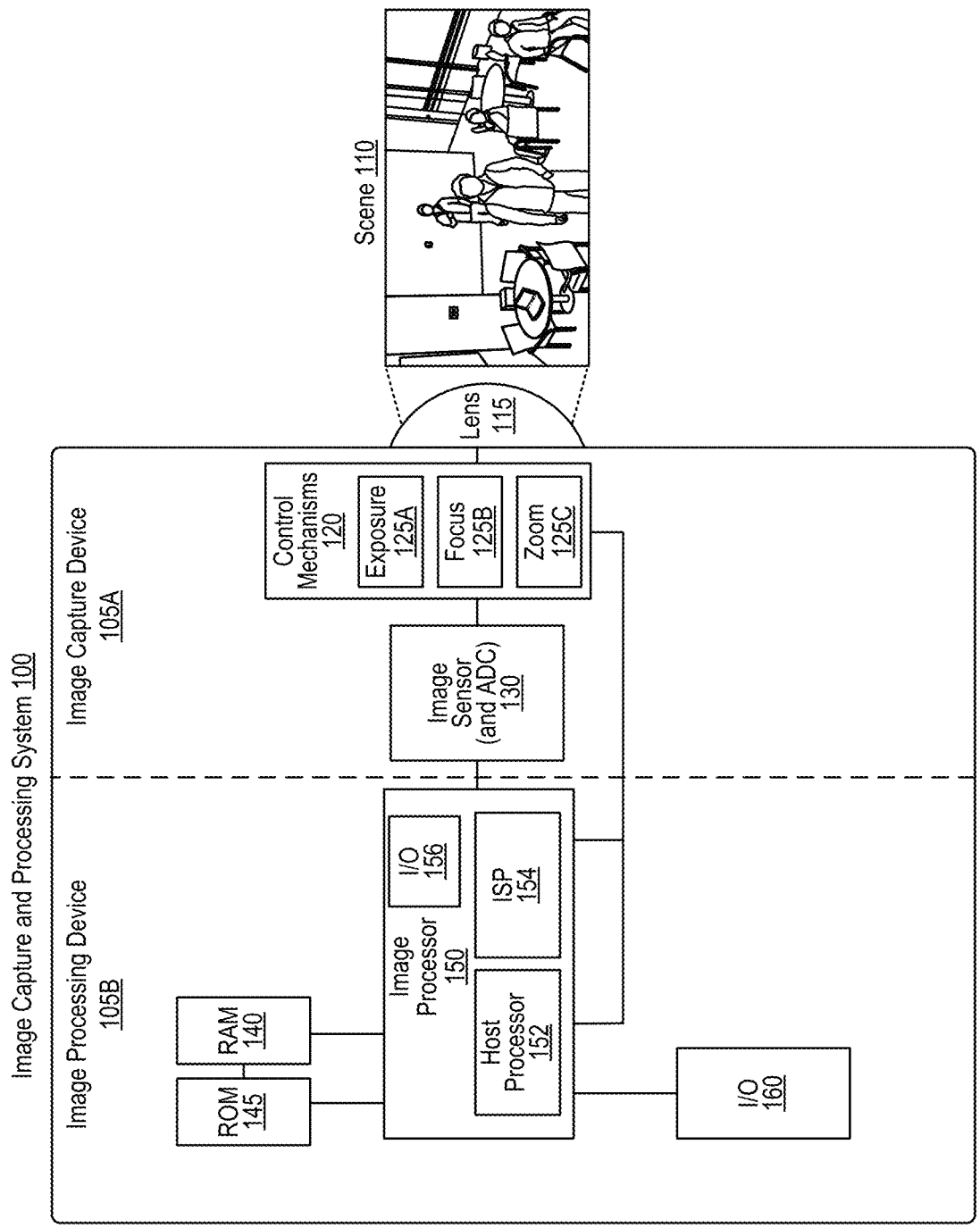
FIG. 1 is a block diagram illustrating an architecture of an image capture and processing system, in accordance with aspects of the present disclosure.

Certain aspects and examples of this disclosure are provided below. Some of these aspects and examples may be applied independently and some of them may be applied in combination as would be apparent to those of skill in the art. In the following description, for the purposes of explanation, specific details are set forth in order to provide a thorough understanding of subject matter of the application. However, it will be apparent that various examples may be practiced without these specific details. The figures and description are not intended to be restrictive.

The ensuing description provides illustrative examples only, and is not intended to limit the scope, applicability, or configuration of the disclosure. Rather, the ensuing description will provide those skilled in the art with an enabling description for implementing the illustrative examples. It should be understood that various changes may be made in the function and arrangement of elements without departing from the spirit and scope of the application as set forth in the appended claims.

Extended reality (XR) systems or devices can provide virtual content to a user and/or can combine real-world or physical environments and virtual environments (made up of virtual content) to provide users with XR experiences. The real-world environment can include real-world objects (also referred to as physical objects), such as people, vehicles, buildings, tables, chairs, and/or other real-world or physical objects. XR systems or devices can facilitate interaction with different types of XR environments (e.g., a user can use an XR system or device to interact with an XR environment). XR systems can include virtual reality (VR) systems facilitating interactions with VR environments, augmented reality (AR) systems facilitating interactions with AR environments, mixed reality (MR) systems facilitating interactions with MR environments, and/or other XR systems. Examples of XR systems or devices include head-mounted displays (HMDs), smart glasses, among others. In some cases, an XR system can track parts of the user (e.g., a hand and/or fingertips of a user) to allow the user to interact with items of virtual content.

AR is a technology that provides virtual or computer-generated content (referred to as AR content) over the user's view of a physical, real-world scene or environment. AR content can include virtual content, such as video, images, graphic content, location data (e.g., global positioning system (GPS) data or other location data), sounds, any combination thereof, and/or other augmented content. An AR system or device is designed to enhance (or augment), rather than to replace, a person's current perception of reality. For example, a user can see a real stationary or moving physical object through an AR device display, but the user's visual perception of the physical object may be augmented or enhanced by a virtual image of that object (e.g., a real-world car replaced by a virtual image of a DeLorean), by AR content added to the physical object (e.g., virtual wings added to a live animal), by AR content displayed relative to the physical object (e.g., informational virtual content displayed near a sign on a building, a virtual coffee cup virtually anchored to (e.g., placed on top of) a real-world table in one or more images, etc.), and/or by displaying other types of AR content. Various types of AR systems can be used for gaming, entertainment, and/or other applications.

In some cases, an XR system can include an optical "see-through" or "pass-through" display (e.g., see-through or pass-through AR HMD or AR glasses), allowing the XR system to display XR content (e.g., AR content) directly onto a real-world view without displaying video content. For example, a user may view physical objects through a display (e.g., glasses or lenses), and the AR system can display AR content onto the display to provide the user with an enhanced visual perception of one or more real-world objects. In one example, a display of an optical see-through AR system can include a lens or glass in front of each eye (or a single lens or glass over both eyes). The see-through display can allow the user to see a real-world or physical object directly, and can display (e.g., projected or otherwise displayed) an enhanced image of that object or additional AR content to augment the user's visual perception of the real world.

Visual simultaneous localization and mapping (VSLAM) is a computational geometry technique used in devices with cameras, such as robots, head-mounted display's (HMDs), mobile handsets, and autonomous vehicles. In VSLAM, a device can construct and update a map of an unknown environment based on images captured by the device's camera. The device can keep track of the device's pose within the environment (e.g., location, position, and/or orientation) as the device updates the map. For example, the device can be activated in a particular room of a building and can move throughout the interior of the building, capturing images. The device can map the environment, and keep track of its location in the environment, based on tracking where different objects in the environment appear in different images.

In the context of systems that track movement through an environment, such as XR systems and/or VSLAM systems, degrees of freedom can refer to which of the six degrees of freedom the system is capable of tracking. 3DoF systems generally track the three rotational DoF—pitch, yaw, and roll. A 3DoF headset, for instance, can track the user of the headset turning their head left or right, tilting their head up or down, and/or tilting their head to the left or right. 6DoF systems can track the three translational DoF as well as the three rotational DoF. Thus, a 6DoF headset, for instance, and can track the user moving forward, backward, laterally, and/or vertically in addition to tracking the three rotational DoF.

In some cases, an XR system may allow a user to start and interact with applications that may be executed within the XR environment displayed by the XR system. For example, applications may execute within a context of an XR system, in a manner similar to how applications may execute within a windowed graphical user interface (GUI) of an operating system (OS). As a part of allowing applications to execute within the context of the XR system, a representation of the applications available to be used may be displayed. In some cases, rather than representing applications using two dimensional (2D) icons, applications may be represented in an XR system by three dimensional (3D) objects.

In some cases, users of XR systems may have data that they wish to quickly share between devices. Examples of data may include files, payments, media (e.g., photos, video, etc.), contact cards, and the like. Existing solutions for transferring such data generally were designed for other device form factors, such as smartphones, tablets, computers, and the like and using an interface designed for those form factors in an XR system can be unintuitive and/or awkward. For example, interfaces designed for non-XR devices or systems may not take advantage of technologies available in an XR system, such as head tracking, localization, mapping, etc.

Systems, apparatuses, electronic devices, methods (also referred to as processes), and computer-readable media (collectively referred to herein as "systems and techniques") are described herein for enhanced private data sharing using XR systems. In some cases, private data sharing may be initiated based on a visual tracking or positioning system. An example of such a visual tracking or positioning system may include simultaneous localization and mapping (SLAM) techniques. In SLAM, a map of an environment (e.g., a map of an environment being modeled by XR system) may be created while simultaneously tracking the location and/or pose of the XR system (e.g., one or more cameras of the XR system) relative to that map. In some cases, the location and/or pose of the XR system may be tracked to help determine other devices that are near the XR system. For instance, the location and/or pose information may be used to determine whether a first XR system, such as a headset, is pointed at another mapped device, such as a second XR system. As an example, if a request to initiate a data transfer is received, first XR system may determine that the second XR system is a target for the data transfer (referred to as a data transfer target or data transfer target device) based on the pose of the first XR system. For example, the second XR system may be determined to be the target if the first XR system is pointed at the second XR system (e.g., a field-of-view of a camera of the first XR system is directed at the second XR system). The first XR system may then contact the second XR system to receive pose information from the second XR system. If the second XR system is pointed back at the first XR system (e.g., the first and second XR systems are facing each other, such as respective cameras of the first and second XR systems), the data transfer may be performed.

In some cases, private data sharing may be initiated based on a location of the XR system. For example, a target for a data transfer (a data transfer target or data transfer target device), such as a payment kiosk may designate a certain location (such as a payment zone) for the data transfer. The target may also display information about the data transfer. For example, the target may display a visual code, such as quick response (QR) code, bar code, unique image, and the like, which can indicate that the data transfer is available. As a more specific example, the visual code may indicate (or may include a link that indicates) that a payment may be made and may include information such as a payment amount and a payment processor that may be used. In some cases, the visual code may be directed at a single XR system. The visual code may indicate (or may include a link that indicates) a location in which the data transfer may occur. An XR system may detect the visual code from the data transfer target. Based on information from the visual code, the XR system may determine its location and transmit its location information to the data transfer target. If the data transfer target determines that the XR system is within the location, the data transfer may be performed.

The systems and techniques described herein provide advantages over existing solutions. For example, using the head pose and location information to verify an initiated data transfer can allow for a more natural way to interact with an XR system as compared to bulky hand controllers using motions and/or actions that a user may easily and naturally perform when sharing information. Moreover, the techniques provide a second factor to help positively identify a target device as well as avoid potential fraud by detecting a motions and/or actions that is relatively unlikely to occur absent deliberate actions.

Various aspects of the application will be described with respect to the figures.

FIG. 1 is a block diagram illustrating an architecture of an image capture and processing system 100. The image capture and processing system 100 includes various components that are used to capture and process images of scenes (e.g., an image of a scene 110). The image capture and processing system 100 can capture standalone images (or photographs) and/or can capture videos that include multiple images (or video frames) in a particular sequence. In some cases, the lens 115 and image sensor 130 can be associated with an optical axis. In one illustrative example, the photosensitive area of the image sensor 130 (e.g., the photodiodes) and the lens 115 can both be centered on the optical axis. A lens 115 of the image capture and processing system 100 faces a scene 110 and receives light from the scene 110. The lens 115 bends incoming light from the scene toward the image sensor 130. The light received by the lens 115 passes through an aperture. In some cases, the aperture (e.g., the aperture size) is controlled by one or more control mechanisms 120 and is received by an image sensor 130. In some cases, the aperture can have a fixed size.

The one or more control mechanisms 120 may control exposure, focus, and/or zoom based on information from the image sensor 130 and/or based on information from the image processor 150. The one or more control mechanisms 120 may include multiple mechanisms and components; for instance, the control mechanisms 120 may include one or more exposure control mechanisms 125A, one or more focus control mechanisms 125B, and/or one or more zoom control mechanisms 125C. The one or more control mechanisms 120 may also include additional control mechanisms besides those that are illustrated, such as control mechanisms controlling analog gain, flash, HDR, depth of field, and/or other image capture properties.

The focus control mechanism 125B of the control mechanisms 120 can obtain a focus setting. In some examples, focus control mechanism 125B store the focus setting in a memory register. Based on the focus setting, the focus control mechanism 125B can adjust the position of the lens 115 relative to the position of the image sensor 130. For example, based on the focus setting, the focus control mechanism 125B can move the lens 115 closer to the image sensor 130 or farther from the image sensor 130 by actuating a motor or servo (or other lens mechanism), thereby adjusting focus. In some cases, additional lenses may be included in the image capture and processing system 100, such as one or more microlenses over each photodiode of the image sensor 130, which each bend the light received from the lens 115 toward the corresponding photodiode before the light reaches the photodiode. The focus setting may be determined via contrast detection autofocus (CDAF), phase detection autofocus (PDAF), hybrid autofocus (HAF), or some combination thereof. The focus setting may be determined using the control mechanism 120, the image sensor 130, and/or the image processor 150. The focus setting may be referred to as an image capture setting and/or an image processing setting. In some cases, the lens 115 can be fixed relative to the image sensor and focus control mechanism 125B can be omitted without departing from the scope of the present disclosure.

The exposure control mechanism 125A of the control mechanisms 120 can obtain an exposure setting. In some cases, the exposure control mechanism 125A stores the exposure setting in a memory register. Based on this exposure setting, the exposure control mechanism 125A can control a size of the aperture (e.g., aperture size or f/stop), a duration of time for which the aperture is open (e.g., exposure time or shutter speed), a duration of time for which the sensor collects light (e.g., exposure time or electronic shutter speed), a sensitivity of the image sensor 130 (e.g., ISO speed or film speed), analog gain applied by the image sensor 130, or any combination thereof. The exposure setting may be referred to as an image capture setting and/or an image processing setting.

The zoom control mechanism 125C of the control mechanisms 120 can obtain a zoom setting. In some examples, the zoom control mechanism 125C stores the zoom setting in a memory register. Based on the zoom setting, the zoom control mechanism 125C can control a focal length of an assembly of lens elements (lens assembly) that includes the lens 115 and one or more additional lenses. For example, the zoom control mechanism 125C can control the focal length of the lens assembly by actuating one or more motors or servos (or other lens mechanism) to move one or more of the lenses relative to one another. The zoom setting may be referred to as an image capture setting and/or an image processing setting. In some examples, the lens assembly may include a parfocal zoom lens or a varifocal zoom lens. In some examples, the lens assembly may include a focusing lens (which can be lens 115 in some cases) that receives the light from the scene 110 first, with the light then passing through an afocal zoom system between the focusing lens (e.g., lens 115) and the image sensor 130 before the light reaches the image sensor 130. The afocal zoom system may, in some cases, include two positive (e.g., converging, convex) lenses of equal or similar focal length (e.g., within a threshold difference of one another) with a negative (e.g., diverging, concave) lens between them. In some cases, the zoom control mechanism 125C moves one or more of the lenses in the afocal zoom system, such as the negative lens and one or both of the positive lenses. In some cases, zoom control mechanism 125C can control the zoom by capturing an image from an image sensor of a plurality of image sensors (e.g., including image sensor 130) with a zoom corresponding to the zoom setting. For example, image processing system 100 can include a wide angle image sensor with a relatively low zoom and a telephoto image sensor with a greater zoom. In some cases, based on the selected zoom setting, the zoom control mechanism 125C can capture images from a corresponding sensor.

The image sensor 130 includes one or more arrays of photodiodes or other photosensitive elements. Each photodiode measures an amount of light that eventually corresponds to a particular pixel in the image produced by the image sensor 130. In some cases, different photodiodes may be covered by different filters. In some cases, different photodiodes can be covered in color filters, and may thus measure light matching the color of the filter covering the photodiode. Various color filter arrays can be used, including a Bayer color filter array, a quad color filter array (also referred to as a quad Bayer color filter array or QCFA), and/or any other color filter array. For instance, Bayer color filters include red color filters, blue color filters, and green color filters, with each pixel of the image generated based on red light data from at least one photodiode covered in a red color filter, blue light data from at least one photodiode covered in a blue color filter, and green light data from at least one photodiode covered in a green color filter. Returning to FIG. 1, other types of color filters may use yellow, magenta, and/or cyan (also referred to as "emerald") color filters instead of or in addition to red, blue, and/or green color filters. In some cases, some photodiodes may be configured to measure infrared (IR) light. In some implementations, photodiodes measuring IR light may not be covered by any filter, thus allowing IR photodiodes to measure both visible (e.g., color) and IR light. In some examples, IR photodiodes may be covered by an IR filter, allowing IR light to pass through and blocking light from other parts of the frequency spectrum (e.g., visible light, color). Some image sensors (e.g., image sensor 130) may lack filters (e.g., color, IR, or any other part of the light spectrum) altogether and may instead use different photodiodes throughout the pixel array (in some cases vertically stacked). The different photodiodes throughout the pixel array can have different spectral sensitivity curves, therefore responding to different wavelengths of light. Monochrome image sensors may also lack filters and therefore lack color depth.

In some cases, the image sensor 130 may alternately or additionally include opaque and/or reflective masks that block light from reaching certain photodiodes, or portions of certain photodiodes, at certain times and/or from certain angles. In some cases, opaque and/or reflective masks may be used for phase detection autofocus (PDAF). In some cases, the opaque and/or reflective masks may be used to block portions of the electromagnetic spectrum from reaching the photodiodes of the image sensor (e.g., an IR cut filter, a UV cut filter, a band-pass filter, low-pass filter, high-pass filter, or the like). The image sensor 130 may also include an analog gain amplifier to amplify the analog signals output by the photodiodes and/or an analog to digital converter (ADC) to convert the analog signals output of the photodiodes (and/or amplified by the analog gain amplifier) into digital signals. In some cases, certain components or functions discussed with respect to one or more of the control mechanisms 120 may be included instead or additionally in the image sensor 130. The image sensor 130 may be a charge-coupled device (CCD) sensor, an electron-multiplying CCD (EMCCD) sensor, an active-pixel sensor (APS), a complimentary metal-oxide semiconductor (CMOS), an N-type metal-oxide semiconductor (NMOS), a hybrid CCD/CMOS sensor (e.g., sCMOS), or some other combination thereof.

Figure 13:
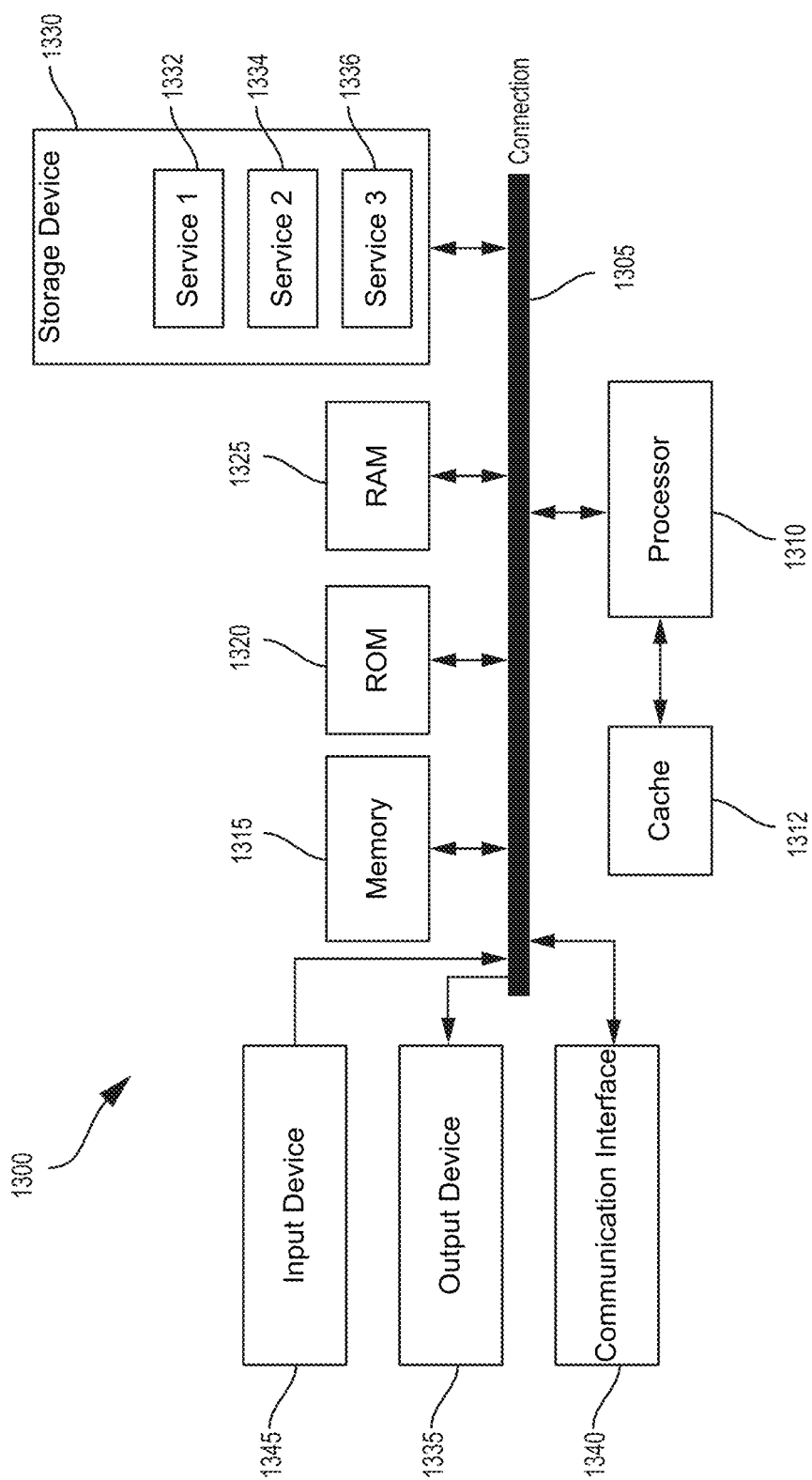
FIG. 13 is a diagram illustrating an example of a system for implementing certain aspects of the present technology.

The image processor 150 may include one or more processors, such as one or more image signal processors (ISPs) (including ISP 154), one or more host processors (including host processor 152), and/or one or more of any other type of processor 1010 discussed with respect to the computing system 1300 of FIG. 13. The host processor 152 can be a digital signal processor (DSP) and/or other type of processor. In some implementations, the image processor 150 is a single integrated circuit or chip (e.g., referred to as a system-on-chip or SoC) that includes the host processor 152 and the ISP 154. In some cases, the chip can also include one or more input/output ports (e.g., input/output (I/O) ports 156), central processing units (CPUs), graphics processing units (GPUs), broadband modems (e.g., 3G, 4G or LTE, 5G, etc.), memory, connectivity components (e.g., Bluetooth™, Global Positioning System (GPS), etc.), any combination thereof, and/or other components. The I/O ports 156 can include any suitable input/output ports or interface according to one or more protocol or specification, such as an Inter-Integrated Circuit 2 (I2C) interface, an Inter-Integrated Circuit 3 (I3C) interface, a Serial Peripheral Interface (SPI) interface, a serial General Purpose Input/Output (GPIO) interface, a Mobile Industry Processor Interface (MIPI) (such as a MIPI CSI-2 physical (PHY) layer port or interface, an Advanced High-performance Bus (AHB) bus, any combination thereof, and/or other input/output port. In one illustrative example, the host processor 152 can communicate with the image sensor 130 using an I2C port, and the ISP 154 can communicate with the image sensor 130 using an MIPI port.

The image processor 150 may perform a number of tasks, such as de-mosaicing, color space conversion, image frame downsampling, pixel interpolation, automatic exposure (AE) control, automatic gain control (AGC), CDAF, PDAF, automatic white balance, merging of image frames to form an HDR image, image recognition, object recognition, feature recognition, receipt of inputs, managing outputs, managing memory, or some combination thereof. The image processor 150 may store image frames and/or processed images in random access memory (RAM) 140/1025, read-only memory (ROM) 145/1020, a cache, a memory unit, another storage device, or some combination thereof.

Various input/output (I/O) devices 160 may be connected to the image processor 150. The I/O devices 160 can include a display screen, a keyboard, a keypad, a touchscreen, a trackpad, a touch-sensitive surface, a printer, any other output devices 1035, any other input devices 1045, or some combination thereof. In some cases, a caption may be input into the image processing device 105B through a physical keyboard or keypad of the I/O devices 160, or through a virtual keyboard or keypad of a touchscreen of the I/O devices 160. The I/O 160 may include one or more ports, jacks, or other connectors that enable a wired connection between the image capture and processing system 100 and one or more peripheral devices, over which the image capture and processing system 100 may receive data from the one or more peripheral device and/or transmit data to the one or more peripheral devices. The I/O 160 may include one or more wireless transceivers that enable a wireless connection between the image capture and processing system 100 and one or more peripheral devices, over which the image capture and processing system 100 may receive data from the one or more peripheral device and/or transmit data to the one or more peripheral devices. The peripheral devices may include any of the previously-discussed types of I/O devices 160 and may themselves be considered I/O devices 160 once they are coupled to the ports, jacks, wireless transceivers, or other wired and/or wireless connectors.

In some cases, the image capture and processing system 100 may be a single device. In some cases, the image capture and processing system 100 may be two or more separate devices, including an image capture device 105A (e.g., a camera) and an image processing device 105B (e.g., a computing device coupled to the camera). In some implementations, the image capture device 105A and the image processing device 105B may be coupled together, for example via one or more wires, cables, or other electrical connectors, and/or wirelessly via one or more wireless transceivers. In some implementations, the image capture device 105A and the image processing device 105B may be disconnected from one another.

As shown in FIG. 1, a vertical dashed line divides the image capture and processing system 100 of FIG. 1 into two portions that represent the image capture device 105A and the image processing device 105B, respectively. The image capture device 105A includes the lens 115, control mechanisms 120, and the image sensor 130. The image processing device 105B includes the image processor 150 (including the ISP 154 and the host processor 152), the RAM 140, the ROM 145, and the I/O 160. In some cases, certain components illustrated in the image capture device 105A, such as the ISP 154 and/or the host processor 152, may be included in the image capture device 105A.

The image capture and processing system 100 can include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the image capture and processing system 100 can include one or more wireless transceivers for wireless communications, such as cellular network communications, 802.11 wi-fi communications, wireless local area network (WLAN) communications, or some combination thereof. In some implementations, the image capture device 105A and the image processing device 105B can be different devices. For instance, the image capture device 105A can include a camera device and the image processing device 105B can include a computing device, such as a mobile handset, a desktop computer, or other computing device.

While the image capture and processing system 100 is shown to include certain components, one of ordinary skill will appreciate that the image capture and processing system 100 can include more components than those shown in FIG. 1. The components of the image capture and processing system 100 can include software, hardware, or one or more combinations of software and hardware. For example, in some implementations, the components of the image capture and processing system 100 can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the image capture and processing system 100.

Figure 2:
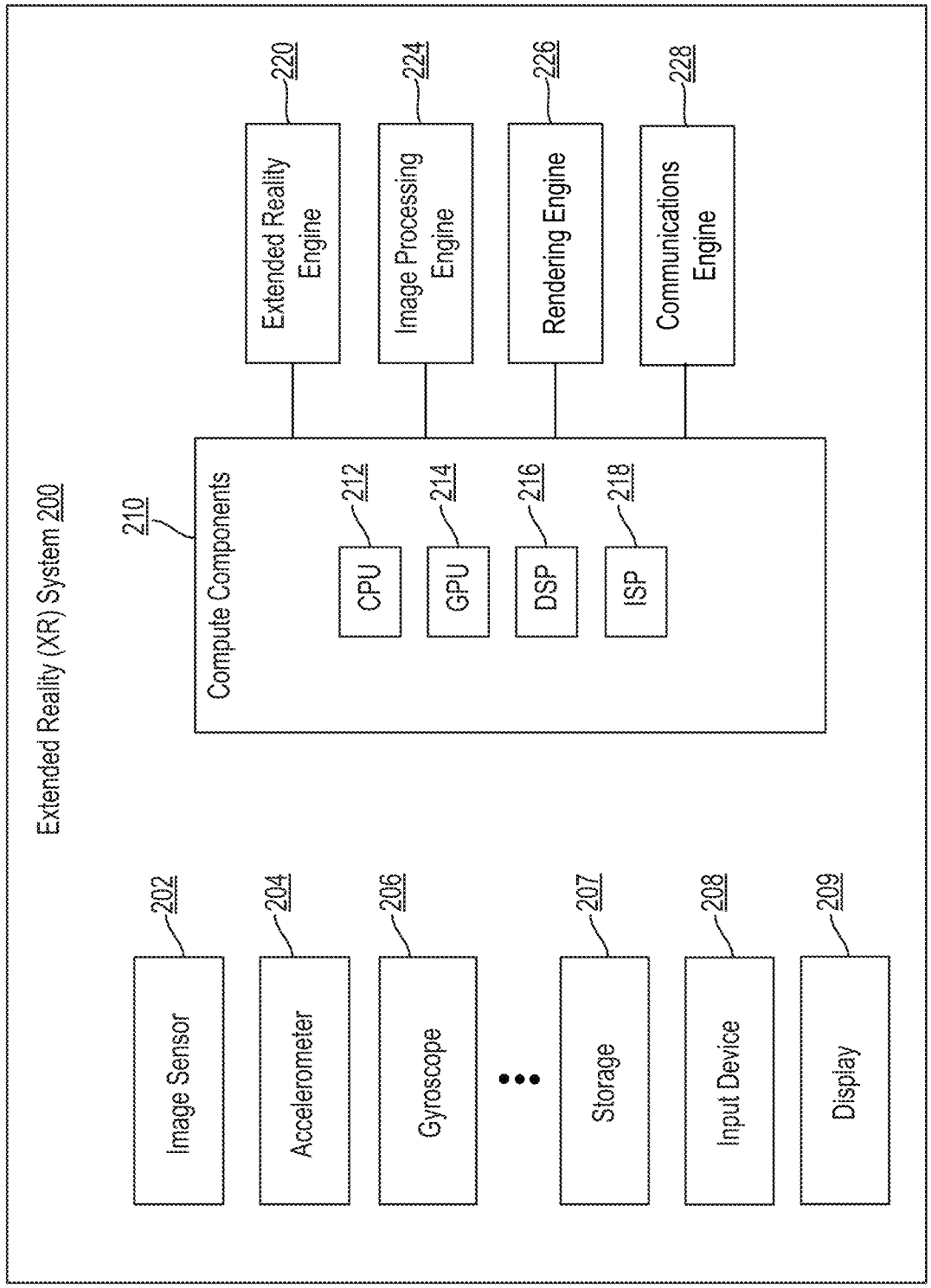
FIG. 2 is a diagram illustrating an architecture of an example extended reality (XR) system, in accordance with some aspects of the disclosure.

In some examples, the extended reality (XR) system 200 of FIG. 2 can include the image capture and processing system 100, the image capture device 105A, the image processing device 105B, or a combination thereof. In some examples, the simultaneous localization and mapping (SLAM) system 300 of FIG. 3 can include the image capture and processing system 100, the image capture device 105A, the image processing device 105B, or a combination thereof.

FIG. 2 is a diagram illustrating an architecture of an example extended reality (XR) system 200, in accordance with some aspects of the disclosure. The XR system 200 can run (or execute) XR applications and implement XR operations. In some examples, the XR system 200 can perform tracking and localization, mapping of an environment in the physical world (e.g., a scene), and/or positioning and rendering of virtual content on a display 209 (e.g., a screen, visible plane/region, and/or other display) as part of an XR experience. For example, the XR system 200 can generate a map (e.g., a three-dimensional (3D) map) of an environment in the physical world, track a pose (e.g., location, position, and/or orientation) of the XR system 200 relative to the environment (e.g., relative to the 3D map of the environment), position and/or anchor virtual content in a specific location(s) on the map of the environment, and render the virtual content on the display 209 such that the virtual content appears to be at a location in the environment corresponding to the specific location on the map of the scene where the virtual content is positioned and/or anchored. The display 209 can include a glass, a screen, a lens, a projector, and/or other display mechanism that allows a user to see the real-world environment and also allows XR content to be overlaid, overlapped, blended with, or otherwise displayed thereon.

In this illustrative example, the XR system 200 includes one or more image sensors 202, an accelerometer 204, a gyroscope 206, storage 207, compute components 210, an XR engine 220, an image processing engine 224, a rendering engine 226, and a communications engine 228. It should be noted that the components 202-228 shown in FIG. 2 are non-limiting examples provided for illustrative and explanation purposes, and other examples can include more, fewer, or different components than those shown in FIG. 2. For example, in some cases, the XR system 200 can include one or more other sensors (e.g., one or more inertial measurement units (IMUs), radars, light detection and ranging (LIDAR) sensors, radio detection and ranging (RADAR) sensors, sound detection and ranging (SODAR) sensors, sound navigation and ranging (SONAR) sensors. audio sensors, etc.), one or more display devices, one more other processing engines, one or more other hardware components, and/or one or more other software and/or hardware components that are not shown in FIG. 2. While various components of the XR system 200, such as the image sensor 202, may be referenced in the singular form herein, it should be understood that the XR system 200 may include multiple of any component discussed herein (e.g., multiple image sensors 202).

The XR system 200 includes or is in communication with (wired or wirelessly) an input device 208. The input device 208 can include any suitable input device, such as a touchscreen, a pen or other pointer device, a keyboard, a mouse a button or key, a microphone for receiving voice commands, a gesture input device for receiving gesture commands, a video game controller, a steering wheel, a joystick, a set of buttons, a trackball, a remote control, any other input device 1045 discussed herein, or any combination thereof. In some cases, the image sensor 202 can capture images that can be processed for interpreting gesture commands.

The XR system 200 can also communicate with one or more other electronic devices (wired or wirelessly). For example, communications engine 228 can be configured to manage connections and communicate with one or more electronic devices. In some cases, the communications engine 228 can correspond to the communications interface 1040 of FIG. 10.

In some implementations, the one or more image sensors 202, the accelerometer 204, the gyroscope 206, storage 207, compute components 210, XR engine 220, image processing engine 224, and rendering engine 226 can be part of the same computing device. For example, in some cases, the one or more image sensors 202, the accelerometer 204, the gyroscope 206, storage 207, compute components 210, XR engine 220, image processing engine 224, and rendering engine 226 can be integrated into an HMD, extended reality glasses, smartphone, laptop, tablet computer, gaming system, and/or any other computing device. However, in some implementations, the one or more image sensors 202, the accelerometer 204, the gyroscope 206, storage 207, compute components 210, XR engine 220, image processing engine 224, and rendering engine 226 can be part of two or more separate computing devices. For example, in some cases, some of the components 202-226 can be part of, or implemented by, one computing device and the remaining components can be part of, or implemented by, one or more other computing devices.

The storage 207 can be any storage device(s) for storing data. Moreover, the storage 207 can store data from any of the components of the XR system 200. For example, the storage 207 can store data from the image sensor 202 (e.g., image or video data), data from the accelerometer 204 (e.g., measurements), data from the gyroscope 206 (e.g., measurements), data from the compute components 210 (e.g., processing parameters, preferences, virtual content, rendering content, scene maps, tracking and localization data, object detection data, privacy data, XR application data, face recognition data, occlusion data, etc.), data from the XR engine 220, data from the image processing engine 224, and/or data from the rendering engine 226 (e.g., output frames). In some examples, the storage 207 can include a buffer for storing frames for processing by the compute components 210.

The one or more compute components 210 can include a central processing unit (CPU) 212, a graphics processing unit (GPU) 214, a digital signal processor (DSP) 216, an image signal processor (ISP) 218, and/or other processor (e.g., a neural processing unit (NPU) implementing one or more trained neural networks). The compute components 210 can perform various operations such as image enhancement, computer vision, graphics rendering, extended reality operations (e.g., tracking, localization, pose estimation, mapping, content anchoring, content rendering, etc.), image and/or video processing, sensor processing, recognition (e.g., text recognition, facial recognition, object recognition, feature recognition, tracking or pattern recognition, scene recognition, occlusion detection, etc.), trained machine learning operations, filtering, and/or any of the various operations described herein. In some examples, the compute components 210 can implement (e.g., control, operate, etc.) the XR engine 220, the image processing engine 224, and the rendering engine 226. In other examples, the compute components 210 can also implement one or more other processing engines.

The image sensor 202 can include any image and/or video sensors or capturing devices. In some examples, the image sensor 202 can be part of a multiple-camera assembly, such as a dual-camera assembly. The image sensor 202 can capture image and/or video content (e.g., raw image and/or video data), which can then be processed by the compute components 210, the XR engine 220, the image processing engine 224, and/or the rendering engine 226 as described herein. In some examples, the image sensors 202 may include an image capture and processing system 100, an image capture device 105A, an image processing device 105B, or a combination thereof.

In some examples, the image sensor 202 can capture image data and can generate images (also referred to as frames) based on the image data and/or can provide the image data or frames to the XR engine 220, the image processing engine 224, and/or the rendering engine 226 for processing. An image or frame can include a video frame of a video sequence or a still image. An image or frame can include a pixel array representing a scene. For example, an image can be a red-green-blue (RGB) image having red, green, and blue color components per pixel; a luma, chroma-red, chroma-blue (YCbCr) image having a luma component and two chroma (color) components (chroma-red and chroma-blue) per pixel; or any other suitable type of color or monochrome image.

In some cases, the image sensor 202 (and/or other camera of the XR system 200) can be configured to also capture depth information. For example, in some implementations, the image sensor 202 (and/or other camera) can include an RGB-depth (RGB-D) camera. In some cases, the XR system 200 can include one or more depth sensors (not shown) that are separate from the image sensor 202 (and/or other camera) and that can capture depth information. For instance, such a depth sensor can obtain depth information independently from the image sensor 202. In some examples, a depth sensor can be physically installed in the same general location as the image sensor 202, but may operate at a different frequency or frame rate from the image sensor 202. In some examples, a depth sensor can take the form of a light source that can project a structured or textured light pattern, which may include one or more narrow bands of light, onto one or more objects in a scene. Depth information can then be obtained by exploiting geometrical distortions of the projected pattern caused by the surface shape of the object. In one example, depth information may be obtained from stereo sensors such as a combination of an infra-red structured light projector and an infra-red camera registered to a camera (e.g., an RGB camera).

The XR system 200 can also include other sensors in its one or more sensors. The one or more sensors can include one or more accelerometers (e.g., accelerometer 204), one or more gyroscopes (e.g., gyroscope 206), and/or other sensors. The one or more sensors can provide velocity, orientation, and/or other position-related information to the compute components 210. For example, the accelerometer 204 can detect acceleration by the XR system 200 and can generate acceleration measurements based on the detected acceleration. In some cases, the accelerometer 204 can provide one or more translational vectors (e.g., up/down, left/right, forward/back) that can be used for determining a position or pose of the XR system 200. The gyroscope 206 can detect and measure the orientation and angular velocity of the XR system 200. For example, the gyroscope 206 can be used to measure the pitch, roll, and yaw of the XR system 200. In some cases, the gyroscope 206 can provide one or more rotational vectors (e.g., pitch, yaw, roll). In some examples, the image sensor 202 and/or the XR engine 220 can use measurements obtained by the accelerometer 204 (e.g., one or more translational vectors) and/or the gyroscope 206 (e.g., one or more rotational vectors) to calculate the pose of the XR system 200. As previously noted, in other examples, the XR system 200 can also include other sensors, such as an inertial measurement unit (IMU), a magnetometer, a gaze and/or eye tracking sensor, a machine vision sensor, a smart scene sensor, a speech recognition sensor, an impact sensor, a shock sensor, a position sensor, a tilt sensor, etc.

As noted above, in some cases, the one or more sensors can include at least one IMU. An IMU is an electronic device that measures the specific force, angular rate, and/or the orientation of the XR system 200, using a combination of one or more accelerometers, one or more gyroscopes, and/or one or more magnetometers. In some examples, the one or more sensors can output measured information associated with the capture of an image captured by the image sensor 202 (and/or other camera of the XR system 200) and/or depth information obtained using one or more depth sensors of the XR system 200.

The output of one or more sensors (e.g., the accelerometer 204, the gyroscope 206, one or more IMUs, and/or other sensors) can be used by the XR engine 220 to determine a pose of the XR system 200 (also referred to as the head pose) and/or the pose of the image sensor 202 (or other camera of the XR system 200). In some cases, the pose of the XR system 200 and the pose of the image sensor 202 (or other camera) can be the same. The pose of image sensor 202 refers to the position and orientation of the image sensor 202 relative to a frame of reference (e.g., with respect to the scene 110). In some implementations, the camera pose can be determined for 6-Degrees Of Freedom (6DoF), which refers to three translational components (e.g., which can be given by X (horizontal), Y (vertical), and Z (depth) coordinates relative to a frame of reference, such as the image plane) and three angular components (e.g. roll, pitch, and yaw relative to the same frame of reference). In some implementations, the camera pose can be determined for 3-Degrees Of Freedom (3DoF), which refers to the three angular components (e.g. roll, pitch, and yaw).

In some cases, a device tracker (not shown) can use the measurements from the one or more sensors and image data from the image sensor 202 to track a pose (e.g., a 6DoF pose) of the XR system 200. For example, the device tracker can fuse visual data (e.g., using a visual tracking solution) from the image data with inertial data from the measurements to determine a position and motion of the XR system 200 relative to the physical world (e.g., the scene) and a map of the physical world. As described below, in some examples, when tracking the pose of the XR system 200, the device tracker can generate a three-dimensional (3D) map of the scene (e.g., the real world) and/or generate updates for a 3D map of the scene. The 3D map updates can include, for example and without limitation, new or updated features and/or feature or landmark points associated with the scene and/or the 3D map of the scene, localization updates identifying or updating a position of the XR system 200 within the scene and the 3D map of the scene, etc. The 3D map can provide a digital representation of a scene in the real/ physical world. In some examples, the 3D map can anchor location-based objects and/or content to real-world coordinates and/or objects. The XR system 200 can use a mapped scene (e.g., a scene in the physical world represented by, and/or associated with, a 3D map) to merge the physical and virtual worlds and/or merge virtual content or objects with the physical environment.

In some aspects, the pose of image sensor 202 and/or the XR system 200 as a whole can be determined and/or tracked by the compute components 210 using a visual tracking solution based on images captured by the image sensor 202 (and/or other camera of the XR system 200). For instance, in some examples, the compute components 210) can perform tracking using computer vision-based tracking, model-based tracking, and/or simultaneous localization and mapping (SLAM) techniques. For instance, the compute components 210) can perform SLAM or can be in communication (wired or wireless) with a SLAM system (not shown), such as the SLAM system 300 of FIG. 3. SLAM refers to a class of techniques where a map of an environment (e.g., a map of an environment being modeled by XR system 200) is created while simultaneously tracking the pose of a camera (e.g., image sensor 202) and/or the XR system 200 relative to that map. The map can be referred to as a SLAM map, and can be three-dimensional (3D). The SLAM techniques can be performed using color or grayscale image data captured by the image sensor 202 (and/or other camera of the XR system 200), and can be used to generate estimates of 6DoF pose measurements of the image sensor 202 and/or the XR system 200. Such a SLAM technique configured to perform 6DoF tracking can be referred to as 6DoF SLAM. In some cases, the output of the one or more sensors (e.g., the accelerometer 204, the gyroscope 206, one or more IMUs, and/or other sensors) can be used to estimate, correct, and/or otherwise adjust the estimated pose.

In some cases, the 6DoF SLAM (e.g., 6DoF tracking) can associate features observed from certain input images from the image sensor 202 (and/or other camera) to the SLAM map. For example, 6DoF SLAM can use feature point associations from an input image to determine the pose (position and orientation) of the image sensor 202 and/or XR system 200 for the input image. 6DoF mapping can also be performed to update the SLAM map. In some cases, the SLAM map maintained using the 6DoF SLAM can contain 3D feature points triangulated from two or more images. For example, key frames can be selected from input images or a video stream to represent an observed scene. For every key frame, a respective 6DoF camera pose associated with the image can be determined. The pose of the image sensor 202 and/or the XR system 200 can be determined by projecting features from the 3D SLAM map into an image or video frame and updating the camera pose from verified 2D-3D correspondences.

In one illustrative example, the compute components 210) can extract feature points from certain input images (e.g., every input image, a subset of the input images, etc.) or from each key frame. A feature (also referred to as a registration point) as used herein is a distinctive or identifiable part of an image, such as a part of a hand, an edge of a table, among others. Features that are detected and extracted from a captured image can be represented by distinct feature points along three-dimensional space (e.g., coordinates on X, Y, and Z-axes), and every feature point can have an associated feature location. The feature points in key frames either match (are the same or correspond to) or fail to match the feature points of previously-captured input images or key frames. Feature detection can be used to detect the feature points. Feature detection can include an image processing operation used to examine one or more pixels of an image to determine whether a feature exists at a particular pixel. Feature detection can be used to process an entire captured image or certain portions of an image. For each image or key frame, once features have been detected, a local image patch around the feature can be extracted. Features may be extracted using any suitable technique, such as Scale Invariant Feature Transform (SIFT) (which localizes features and generates their descriptions), Learned Invariant Feature Transform (LIFT), Speed Up Robust Features (SURF), Gradient Location-Orientation histogram (GLOH), Oriented Fast and Rotated Brief (ORB), Binary Robust Invariant Scalable Keypoints (BRISK), Fast Retina Keypoint (FREAK), KAZE, Accelerated KAZE (AKAZE), Normalized Cross Correlation (NCC), descriptor matching, another suitable technique, or a combination thereof.

In some cases, the XR system 200 can also track the hand and/or fingers of the user to allow the user to interact with and/or control virtual content in a virtual environment. For example, the XR system 200 can track a pose and/or movement of the hand and/or fingertips of the user to identify or translate user interactions with the virtual environment. The user interactions can include, for example and without limitation, moving an item of virtual content, resizing the item of virtual content, selecting an input interface element in a virtual user interface (e.g., a virtual representation of a mobile phone, a virtual keyboard, and/or other virtual interface), providing an input through a virtual user interface, etc.

Figure 3:
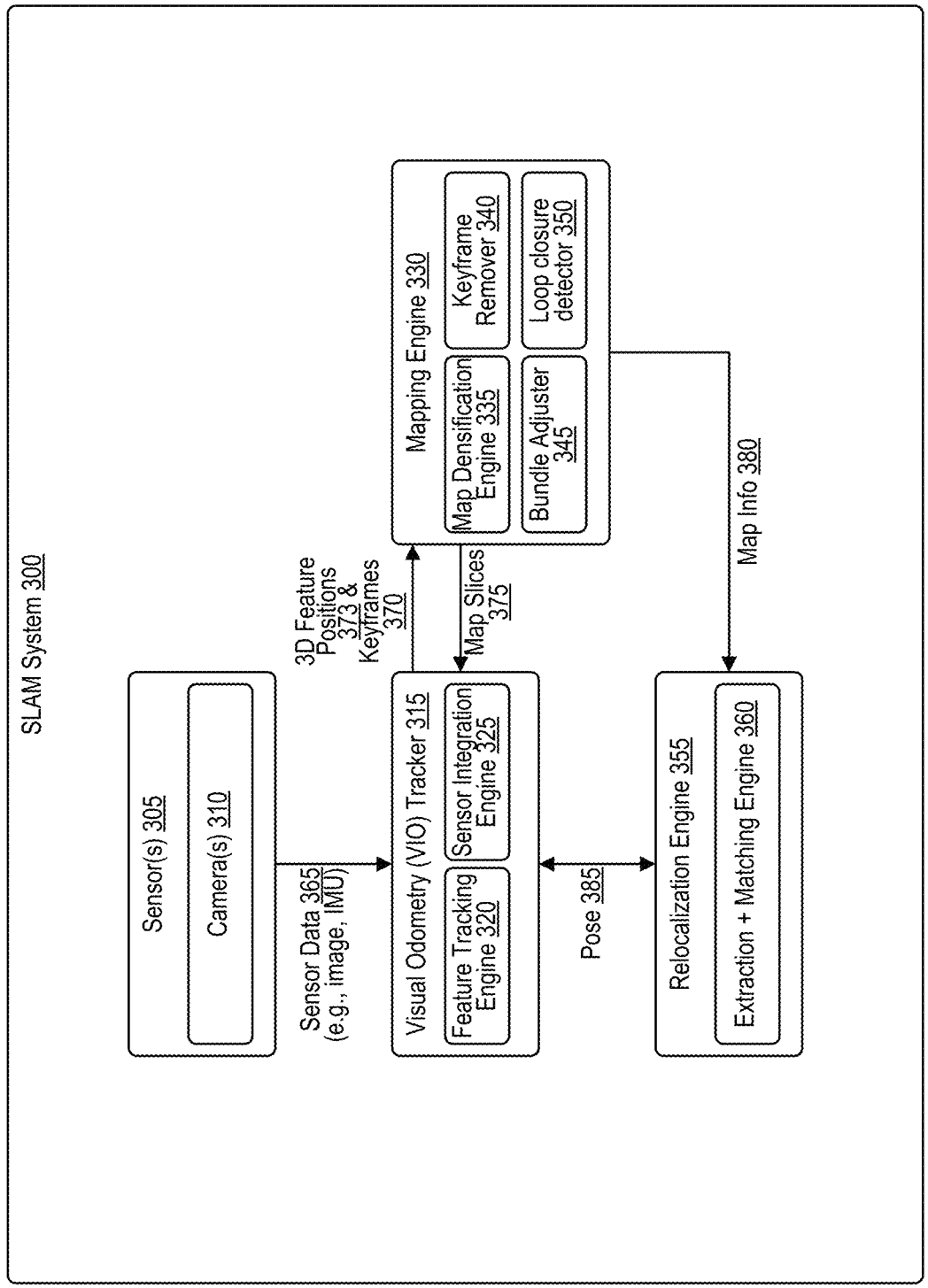
FIG. 3 is a block diagram illustrating an architecture of a simultaneous localization and mapping (SLAM) system, in accordance with aspects of the present disclosure.

FIG. 3 is a block diagram illustrating an architecture of a simultaneous localization and mapping (SLAM) system 300. In some examples, the SLAM system 300 can be, or can include, an extended reality (XR) system, such as the XR system 200 of FIG. 2. In some examples, the SLAM system 300 can be a wireless communication device, a mobile device or handset (e.g., a mobile telephone or so-called "smart phone" or other mobile device), a wearable device, a personal computer, a laptop computer, a server computer, a portable video game console, a portable media player, a camera device, a manned or unmanned ground vehicle, a manned or unmanned aerial vehicle, a manned or unmanned aquatic vehicle, a manned or unmanned underwater vehicle, a manned or unmanned vehicle, an autonomous vehicle, a vehicle, a computing system of a vehicle, a robot, another device, or any combination thereof.

The SLAM system 300 of FIG. 3 includes, or is coupled to, each of one or more sensors 305. The one or more sensors 305 can include one or more cameras 310. Each of the one or more cameras 310 may include an image capture device 105A, an image processing device 105B, an image capture and processing system 100, another type of camera, or a combination thereof. Each of the one or more cameras 310 may be responsive to light from a particular spectrum of light. The spectrum of light may be a subset of the electromagnetic (EM) spectrum. For example, each of the one or more cameras 310 may be a visible light (VL) camera responsive to a VL spectrum, an infrared (IR) camera responsive to an IR spectrum, an ultraviolet (UV) camera responsive to a UV spectrum, a camera responsive to light from another spectrum of light from another portion of the electromagnetic spectrum, or a some combination thereof.

The one or more sensors 305 can include one or more other types of sensors other than cameras 310, such as one or more of each of: accelerometers, gyroscopes, magnetometers, inertial measurement units (IMUs), altimeters, barometers, thermometers, radio detection and ranging (RADAR) sensors, light detection and ranging (LIDAR) sensors, sound navigation and ranging (SONAR) sensors, sound detection and ranging (SODAR) sensors, global navigation satellite system (GNSS) receivers, global positioning system (GPS) receivers, BeiDou navigation satellite system (BDS) receivers, Galileo receivers, Globalnaya Navigazionnaya Sputnikovaya Sistema (GLONASS) receivers, Navigation Indian Constellation (NavIC) receivers, Quasi-Zenith Satellite System (QZSS) receivers, Wi-Fi positioning system (WPS) receivers, cellular network positioning system receivers, Bluetooth® beacon positioning receivers, short-range wireless beacon positioning receivers, personal area network (PAN) positioning receivers, wide area network (WAN) positioning receivers, wireless local area network (WLAN) positioning receivers, other types of positioning receivers, other types of sensors discussed herein, or combinations thereof. In some examples, the one or more sensors 305 can include any combination of sensors of the XR system 200 of FIG. 2.

The SLAM system 300 of FIG. 3 includes a visual-inertial odometry (VIO) tracker 315. The term visual-inertial odometry may also be referred to herein as visual odometry. The VIO tracker 315 receives sensor data 365 from the one or more sensors 305. For instance, the sensor data 365 can include one or more images captured by the one or more cameras 310. The sensor data 365 can include other types of sensor data from the one or more sensors 305, such as data from any of the types of sensors 305 listed herein. For instance, the sensor data 365 can include inertial measurement unit (IMU) data from one or more IMUs of the one or more sensors 305.

Upon receipt of the sensor data 365 from the one or more sensors 305, the VIO tracker 315 performs feature detection, extraction, and/or tracking using a feature tracking engine 320 of the VIO tracker 315. For instance, where the sensor data 365 includes one or more images captured by the one or more cameras 310 of the SLAM system 300, the VIO tracker 315 can identify, detect, and/or extract features in each image. Features may include visually distinctive points in an image, such as portions of the image depicting edges and/or corners. The VIO tracker 315 can receive sensor data 365 periodically and/or continually from the one or more sensors 305, for instance by continuing to receive more images from the one or more cameras 310 as the one or more cameras 310 capture a video, where the images are video frames of the video. The VIO tracker 315 can generate descriptors for the features. Feature descriptors can be generated at least in part by generating a description of the feature as depicted in a local image patch extracted around the feature. In some examples, a feature descriptor can describe a feature as a collection of one or more feature vectors. A feature vector may be a vector of values describing how well a particular feature matches with a feature detector. The VIO tracker 315, in some cases with a mapping engine 330 and/or a relocalization engine 355, can associate the plurality of features with a map of the environment based on such feature descriptors. The feature tracking engine 320 of the VIO tracker 315 can perform feature tracking by recognizing features in each image that the VIO tracker 315 already previously recognized in one or more previous images, in some cases based on identifying features with matching feature descriptors in different images. The feature tracking engine 320 can track changes in one or more positions at which the feature is depicted in each of the different images. For example, the feature extraction engine can detect a particular corner of a room depicted in a left side of a first image captured by a first camera of the cameras 310. The feature extraction engine can detect the same feature (e.g., the same particular corner of the same room) depicted in a right side of a second image captured by the first camera. The feature tracking engine 320 can recognize that the features detected in the first image and the second image are two depictions of the same feature (e.g., the same particular corner of the same room), and that the feature appears in two different positions in the two images. The VIO tracker 315 can determine, based on the same feature appearing on the left side of the first image and on the right side of the second image that the first camera has moved, for example if the feature (e.g., the particular corner of the room) depicts a static portion of the environment.

The VIO tracker 315 can include a sensor integration engine 325. The sensor integration engine 325 can use sensor data from other types of sensors 305 (other than the cameras 310) to determine information that can be used by the feature tracking engine 320 when performing the feature tracking. For example, the sensor integration engine 325 can receive IMU data (e.g., which can be included as part of the sensor data 365) from an IMU of the one or more sensors 305. The sensor integration engine 325 can determine, based on the IMU data in the sensor data 365, that the SLAM system 300 has rotated 15 degrees in a clockwise direction from acquisition or capture of a first image and capture to acquisition or capture of the second image by a first camera of the cameras 310. Based on this determination, the sensor integration engine 325 can identify that a feature depicted at a first position in the first image is expected to appear at a second position in the second image, and that the second position is expected to be located to the left of the first position by a predetermined distance (e.g., a predetermined number of pixels, inches, centimeters, millimeters, or another distance metric). The feature tracking engine 320 can take this expectation into consideration in tracking features between the first image and the second image.

Based on the feature tracking by the feature tracking engine 320 and/or the sensor integration by the sensor integration engine 325, the VIO tracker 315 can determine a 3D feature positions 373 of a particular feature. The 3D feature positions 373 can include one or more 3D feature positions and can also be referred to as 3D feature points. The 3D feature positions 373 can be a set of coordinates along three different axes that are perpendicular to one another, such as an X coordinate along an X axis (e.g., in a horizontal direction), a Y coordinate along a Y axis (e.g., in a vertical direction) that is perpendicular to the X axis, and a Z coordinate along a Z axis (e.g., in a depth direction) that is perpendicular to both the X axis and the Y axis. The VIO tracker 315 can also determine one or more keyframes 370 (referred to hereinafter as keyframes 370) corresponding to the particular feature. A key frame (from one or more keyframes 370) corresponding to a particular feature may be an image in which the particular feature is clearly depicted. In some examples, a keyframe (from the one or more keyframes 370) corresponding to a particular feature may be an image in which the particular feature is clearly depicted. In some examples, a keyframe corresponding to a particular feature may be an image that reduces uncertainty in the 3D feature positions 373 of the particular feature when considered by the feature tracking engine 320 and/or the sensor integration engine 325 for determination of the 3D feature positions 373. In some examples, a keyframe corresponding to a particular feature also includes data associated with the pose 385 of the SLAM system 300 and/or the camera(s) 310) during capture of the keyframe. In some examples, the VIO tracker 315 can send 3D feature positions 373 and/or keyframes 370) corresponding to one or more features to the mapping engine 330). In some examples, the VIO tracker 315 can receive map slices 375 from the mapping engine 330. The VIO tracker 315 can detect feature information within the map slices 375 for feature tracking using the feature tracking engine 320.

Based on the feature tracking by the feature tracking engine 320 and/or the sensor integration by the sensor integration engine 325, the VIO tracker 315 can determine a pose 385 of the SLAM system 300 and/or of the cameras 310 during capture of each of the images in the sensor data 365. The pose 385 can include a location of the SLAM system 300 and/or of the cameras 310 in 3D space, such as a set of coordinates along three different axes that are perpendicular to one another (e.g., an X coordinate, a Y coordinate, and a Z coordinate). The pose 385 can include an orientation of the SLAM system 300 and/or of the cameras 310 in 3D space, such as pitch, roll, yaw, or some combination thereof. In some examples, the VIO tracker 315 can send the pose 385 to the relocalization engine 355. In some examples, the VIO tracker 315 can receive the pose 385 from the relocalization engine 355.

The SLAM system 300 also includes a mapping engine 330. The mapping engine 330 generates a 3D map of the environment based on the 3D feature positions 373 and/or the key frames 370 received from the VIO tracker 315. The mapping engine 330 can include a map densification engine 335, a keyframe remover 340, a bundle adjuster 345, and/or a loop closure detector 350. The map densification engine 335 can perform map densification, in some examples, increase the quantity and/or density of 3D coordinates describing the map geometry. The keyframe remover 340 can remove keyframes, and/or in some cases add keyframes. In some examples, the keyframe remover 340 can remove keyframes 370 corresponding to a region of the map that is to be updated and/or whose corresponding confidence values are low. The bundle adjuster 345 can, in some examples, refine the 3D coordinates describing the scene geometry, parameters of relative motion, and/or optical characteristics of the image sensor used to generate the frames, according to an optimality criterion involving the corresponding image projections of all points. The loop closure detector 350 can recognize when the SLAM system 300 has returned to a previously mapped region, and can use such information to update a map slice and/or reduce the uncertainty in certain 3D feature points or other points in the map geometry. The mapping engine 330 can output map slices 375 to the VIO tracker 315. The map slices 375 can represent 3D portions or subsets of the map. The map slices 375 can include map slices 375 that represent new, previously-unmapped areas of the map. The map slices 375 can include map slices 375 that represent updates (or modifications or revisions) to previously-mapped areas of the map. The mapping engine 330 can output map information 380 to the relocalization engine 355. The map information 380 can include at least a portion of the map generated by the mapping engine 330. The map information 380 can include one or more 3D points making up the geometry of the map, such as one or more 3D feature positions 373. The map information 380 can include one or more keyframes 370 corresponding to certain features and certain 3D feature positions 373.

The SLAM system 300 also includes the relocalization engine 355. The relocalization engine 355 can perform relocalization, for instance when the VIO tracker 315 fail to recognize more than a threshold number of features in an image, and/or the VIO tracker 315 loses track of the pose 385 of the SLAM system 300 within the map generated by the mapping engine 330. The relocalization engine 355 can perform relocalization by performing extraction and matching using an extraction and matching engine 360. For instance, the extraction and matching engine 360 can by extract features from an image captured by the cameras 310 of the SLAM system 300 while the SLAM system 300 is at a current pose 385, and can match the extracted features to features depicted in different keyframes 370, identified by 3D feature positions 373, and/or identified in the map information 380. By matching these extracted features to the previously-identified features, the relocalization engine 355 can identify that the pose 385 of the SLAM system 300 is a pose 385 at which the previously-identified features are visible to the cameras 310 of the SLAM system 300, and is therefore similar to one or more previous poses 385 at which the previously-identified features were visible to the cameras 310. In some cases, the relocalization engine 355 can perform relocalization based on wide baseline mapping, or a distance between a current camera position and camera position at which feature was originally captured. The relocalization engine 355 can receive information for the pose 385 from the VIO tracker 315, for instance regarding one or more recent poses of the SLAM system 300 and/or cameras 310, which the relocalization engine 355 can base its relocalization determination on. Once the relocalization engine 355 relocates the SLAM system 300 and/or cameras 310 and thus determines the pose 385, the relocalization engine 355 can output the pose 385 to the VIO tracker 315.

In some examples, the VIO tracker 315 can modify the image in the sensor data 365 before performing feature detection, extraction, and/or tracking on the modified image. For example, the VIO tracker 315 can rescale and/or resample the image. In some examples, rescaling and/or resampling the image can include downscaling, downsampling, subscaling, and/or subsampling the image one or more times. In some examples, the VIO tracker 315 modifying the image can include converting the image from color to greyscale, or from color to black and white, for instance by desaturating color in the image, stripping out certain color channel(s), decreasing color depth in the image, replacing colors in the image, or a combination thereof. In some examples, the VIO tracker 315 modifying the image can include the VIO tracker 315 masking certain regions of the image. Dynamic objects can include objects that can have a changed appearance between one image and another. For example, dynamic objects can be objects that move within the environment, such as people, vehicles, or animals. A dynamic objects can be an object that have a changing appearance at different times, such as a display screen that may display different things at different times. A dynamic object can be an object that has a changing appearance based on the pose of the camera(s) 310, such as a reflective surface, a prism, or a specular surface that reflects, refracts, and/or scatters light in different ways depending on the position of the camera(s) 310 relative to the dynamic object. The VIO tracker 315 can detect the dynamic objects using facial detection, facial recognition, facial tracking, object detection, object recognition, object tracking, or a combination thereof. The VIO tracker 315 can detect the dynamic objects using one or more artificial intelligence algorithms, one or more trained machine learning models, one or more trained neural networks, or a combination thereof. The VIO tracker 315 can mask one or more dynamic objects in the image by overlaying a mask over an area of the image that includes depiction(s) of the one or more dynamic objects. The mask can be an opaque color, such as black. The area can be a bounding box having a rectangular or other polygonal shape. The area can be determined on a pixel-by-pixel basis.

Figure 4:
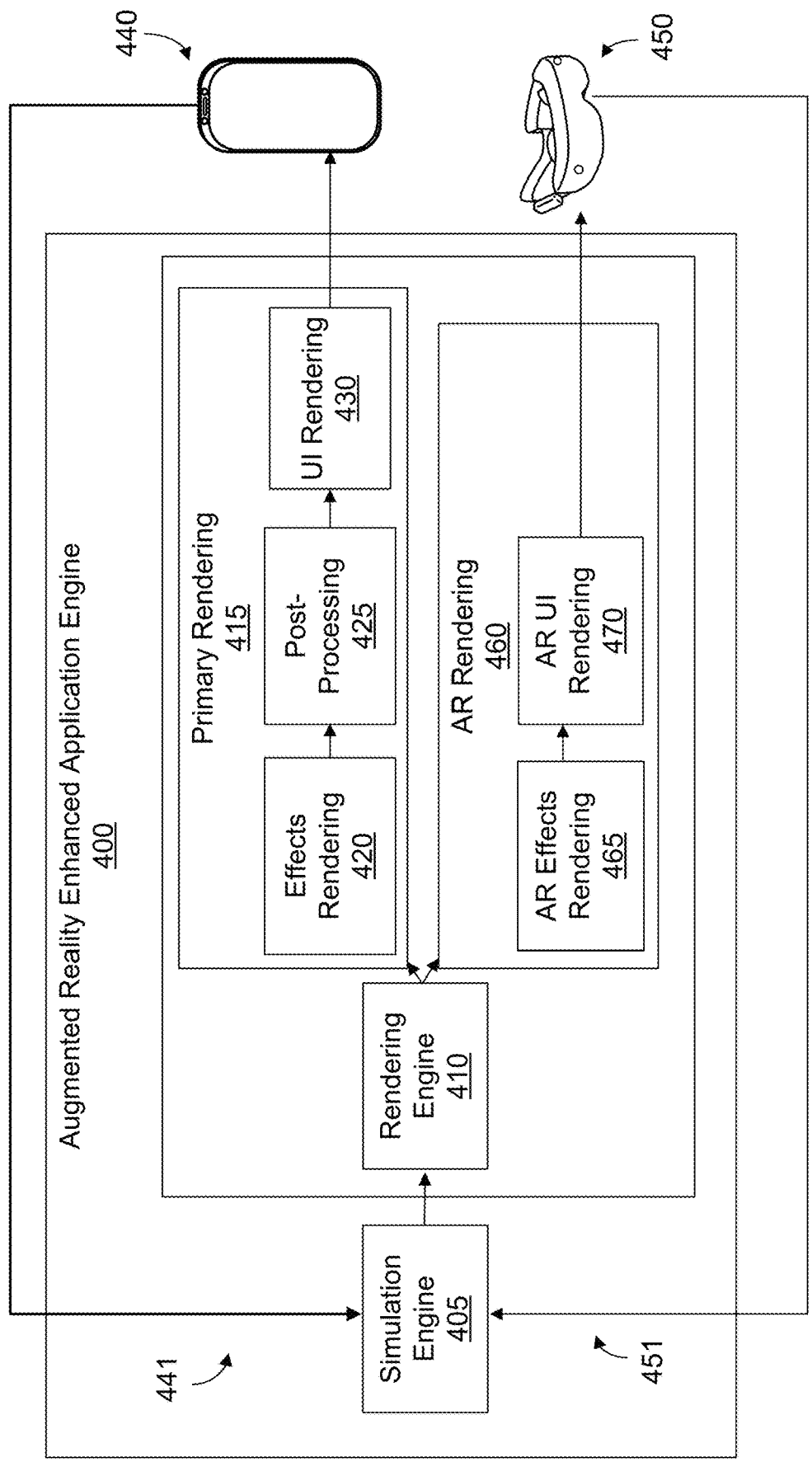
FIG. 4 is a block diagram illustrating a system for pose estimation, in accordance with aspects of the present disclosure.

FIG. 4 is a block diagram of an augmented reality enhanced application engine 400 illustrating a system for pose estimation, in accordance with aspects of the present disclosure. As indicated above, a feature tracking engine 320, may perform feature tracking by recognizing features that were previously recognized in one or more previous images. In some cases, the feature tracking engine 320 may receive map slices 375, as well as camera frames 402 and IMU sensor data 404. In some cases, the camera frames 402 may be received from one or more cameras of the SLAM system. In some cases, these camera frames may also be displayed to a user of the SLAM system. In other cases, the SLAM system may include one or more cameras for performing localization and/or mapping. The map slices 375 may be portions of a feature map of the environment. In some cases, the map slices may be a three-dimensional (3D) representation of the environment, such as a 3D point cloud, that includes estimates of 3D positions of features in the environment at a previous point in time. In some cases, based on the IMU sensor data 404, a pose and feature prediction engine 406 may predict a pose of the SLAM system (e.g., cameras of the SLAM system) along with locations for where features in map slices 375 should be at a current point in time based on the predicted pose of the SLAM system. For example, the positions of features in the environment may be adjusted based on movement of the SLAM system, as indicated by the IMU sensor data 404 (e.g., movement data). In some cases, pose information for cameras of the SLAM system may be determined based on pose information for the overall SLAM system.

In some cases, IMU sensor data 404 may be relatively noisy and/or may include biases which may vary over time and it may be difficult to rely on the IMU sensor data 404, especially over longer periods of time. To help account for and correct possible noise and/or bias, the IMU sensor data 404 may be used to help guide image based feature tracking.

The predications from the pose and feature prediction engine 406 may be passed to a feature tracker 408. The feature tracker 408 may attempt to match the previously tracked features to features in more recently received camera frames 402, such as a current frame. For example, the feature tracker 408 may use the predicted locations of the previously tracked features and matching techniques, such as patch based matching, sum of square difference, sum of absolute difference, normalized cross correlation, and the like to match the previously tracked features to features in a current camera frame 402. Based on the matched features, a pose of the SLAM system (e.g., as a part of a wearable device, an HMD, or other component of an XR system) may be estimated, for example by a pose and feature estimation engine 410. In some cases, the pose and feature estimation engine 410 may also estimate a 3D position of the matched features. The pose information for the SLAM system and features may be output 385 for use by other components of the SLAM system.

In some cases, XR devices may use multiple cameras for localization and/or mapping. For example, an XR device may include four or more cameras for 6 DoF and feature tracking. The cameras may be pointed in any direction, not just the direction a user of the XR device is facing. Including multiple cameras helps to allow depth information for features to be more easily and/or accurately gathered. Additionally, multiple cameras help to allow for better camera coverage and increase robustness, especially for environments with relatively low lighting or relatively low feature density.

In some cases, features which allow an XR device to more easily interact with objects and/or other XR devices proximate to the XR device may be useful to enhance the interactivity and/or usefulness of the XR device. One such feature may include data sharing as between devices. For example, it can be useful to provide a lightweight and multi-factor technique that can allow XR devices that are nearby to exchange files, payments, photos, contact cards, and the like. To help provide a more seamless experience, technologies native to XR systems, such as head tracking, pose detection/tracking, localization, mapping, etc. may be used applied rather than interfaces more suited to pointer/touch based user interfaces currently in use.

Figure 5:
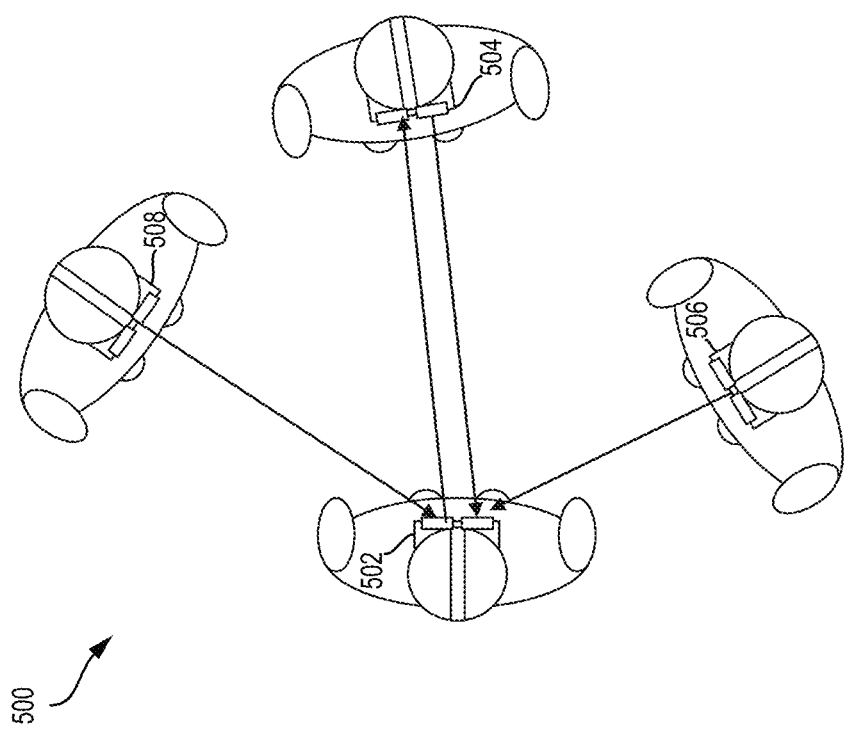
FIG. 5 illustrates a technique for private data sharing for XR systems, in accordance with aspects of the present disclosure.

FIG. 5 illustrates a technique 500 for private data sharing for XR systems, in accordance with aspects of the present disclosure. In FIG. 5, a first XR device 502 being worn by a first user, may be participating in an XR session with a second XR device 504 being worn by a second user, a third XR device 506 being worn by a third user, and a fourth XR device 508 being worn by a fourth user. For example, the first XR device 502 may be communicating with the second XR device 504, third XR device 506, and fourth XR device 508, and the XR devices may be operating based on a common map of features in the environment (e.g., a feature map). As discussed above, each XR device may perform feature tracking and/or another localization and mapping process to locate itself in an environment based on a feature map. In some cases, this feature map may be a common feature map shared by multiple XR devices and the XR device may compare features detected in images of the environment with features in the feature map to determine the XR device's location and pose. In some cases, each XR device may include a local feature map and each XR device may align its local feature map with a common feature map for the XR session. The XR devices in an XR session may also send their location and/or pose information to the other XR devices in the XR session. Of note, while an XR device is described, it may be understood that the techniques discussed herein performed by an XR device may be performed by any device capable of, and performing, functionality typically found on an XR device such as pose detection/tracking and localization. For example, a device, such as a portable device like a mobile phone, may be configured to perform pose detection/tracking and localization of a user with (or without) the use of additional sensors, such as telepresence cameras, headset devices, etc., and the techniques discussed herein may be performed by such devices. Additionally, devices that may be coupled to an XR device, such as hand controllers, additional sensors, other portable devices, etc., may also perform pose detection/tracking and localization and the techniques discussed herein may be performed by such devices.

In some cases, an XR device, such as the first XR device 502, may be in an environment with multiple other devices, such as XR devices, other wireless and/or portable devices, wired devices, IoT devices, etc., and it may be challenging to determine which device to perform a data transfer to (e.g., share data with). In some cases, the localization and/or pose estimation processes of the XR device may be leveraged to determine which device to perform a data transfer to. For example, the first XR device 502 may determine, based on its pose and location, and the location of other devices, such as the second XR device 504, third XR device 506, and fourth XR device 508, whether the first XR device 502 is pointed at another device, such as the second XR device 504. If the first XR device is pointed at another device (e.g., a target device, such as the second XR device 504), data transfer may be initiated. Additionally, while other nearby devices, such as the third XR device 506 and fourth XR device 508 may be pointed at the first XR device 502, as the first XR device was not pointed toward those devices, data transfer is not initiated as to those other devices. In some cases, the data transfer may be confirmed by the target device by pointing the target device back at the first XR device 502. Private data transfer as between the first XR device 502 and the target device (e.g., second XR device 504, may then begin.

Figure 6:
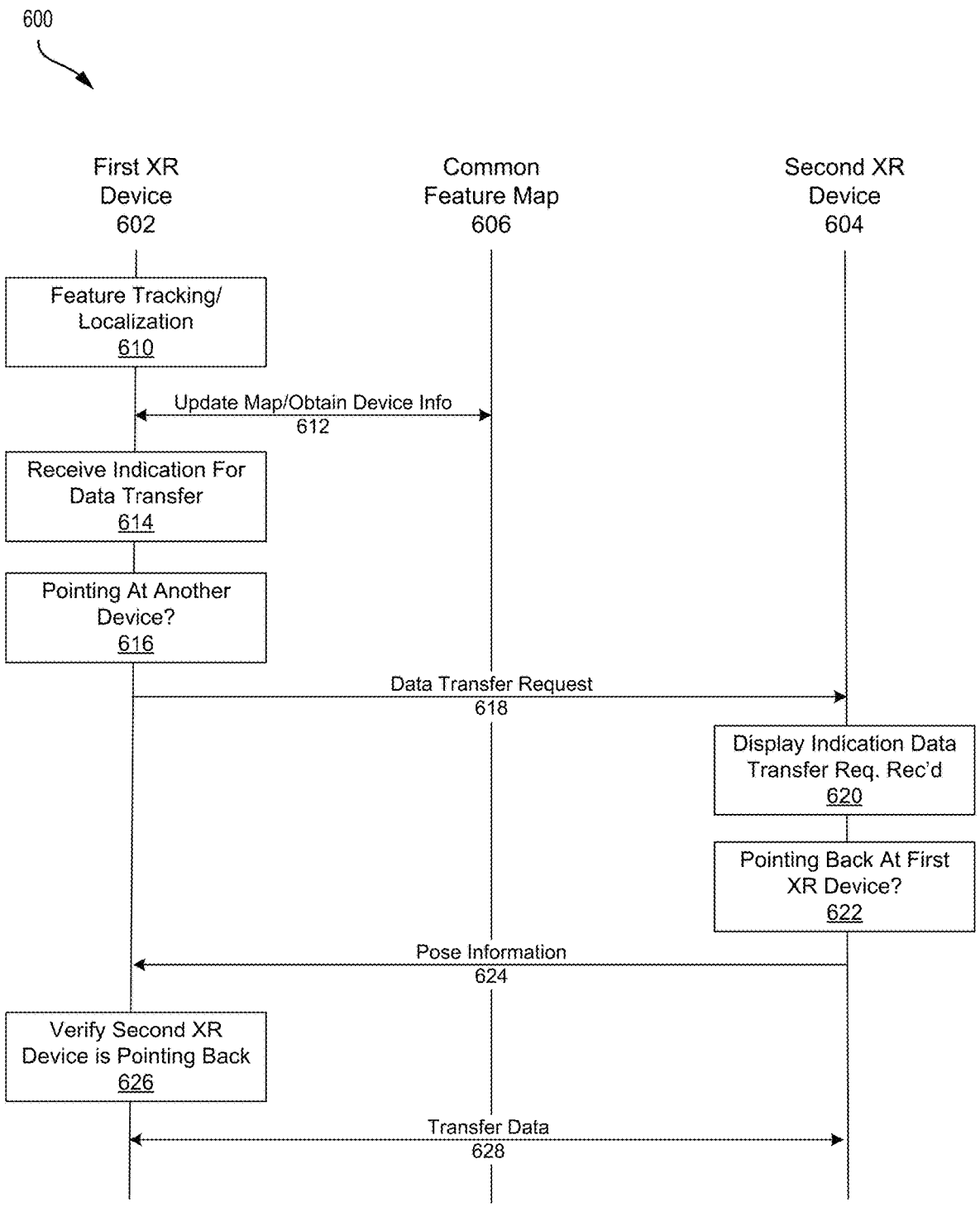
FIG. 6 is a data flow diagram illustrating messages exchanged for a private data sharing technique, in accordance with aspects of the present disclosure.

FIG. 6 is a data flow diagram illustrating messages exchanged for a private data sharing technique 600, in accordance with aspects of the present disclosure. FIG. 6 includes a first XR device 602, a second XR device 604, and a common feature map 606. The common feature map 606 may be accessible to XR devices participating in the XR session. In some cases, the common feature map 606 may be stored separate from the first XR device 602 and second XR device 604, such as on a server or hosted service. In other cases, the common feature map 608 may be hosted and/or synchronized across the devices participating in an XR session. In FIG. 6, the first XR device 602 may, at step 610, perform a localization process to determine where the first XR device 602 is located in the physical environment and a pose estimation process to determine a pose of the first XR device 602. The first XR device 602 may, at step 612, update the common feature map 606 with the determined location and pose of the first XR device 602. Other devices, such as the second XR device 604, may also update (not shown) the common feature map 606 with their location and pose information and the first XR device 602 may obtain the location and pose information for those other devices at step 612.

In some cases, a first user of the first XR device 602 may want to share data with a second user of the second XR device 604. To initiate a data transfer, the first user may use a user interface of the first XR device 602 to indicate an intent to transfer data and/or identify the data to be transferred. For example, at step 614, the first XR device 602 may receive an input to a UI of the first XR device 602 requesting initiating a data transfer to another XR device (e.g., an indication to perform a data transfer). The first XR device 602 may also receive an indication of data for transfer, for example, from the first user. In some cases, in response to the indication to perform a data transfer, the first XR device 602 may enter a data transfer mode or state. The first XR device 602 may determine, at step 616, whether the first XR device 602 is pointing at another device based on the location and pose information for the first XR device 602 and the location and pose information for other devices from the common feature map 606. For example, the first XR device 602 may extrapolate in a forward direction, in the common feature map 606, based on the pose and location of the first XR device 602 to determine if the first XR device 602 is pointed at another device in front of the first XR device 602, such as the second XR device 604.

In this example, the first XR device 602 is pointed at the second XR device 604 and the first XR device 602 may then determine that it is pointed at another device (e.g., the second XR device 604). Of note, the determination whether the first XR device 602 is pointed at another device may not require that the first XR device 602 to be pointed exactly at the other device. In some cases, that the first XR device 602 is pointed at some area around the other device may be sufficient for the determination that the first XR device 602 is pointed at the other device to be made. Exactly how large this area around the other device is may be a design decision. In some cases, the size of the area may be based on an expected reach (e.g., approximately arm length) of the user of the device. In some cases, the determination that the first XR device 602 is pointed at another device may be made if the first XR device 602 is pointed at the other device for more than a threshold amount of time. For example, the determination that the first XR device 602 is pointed at another device may be made if the first XR device 602 is pointed at the other device for more four seconds. The other device does not need to be pointed back at the first XR device 602 for the determination that the first XR device 602 is pointed at another device to be made.

In some cases, eye tracking by the first XR device 602 may also be used. For example, the first XR device 602 may track one or more eyes of the first user to determine if they are looking toward another device. A determination that the first XR device 602 is pointed at the other device may be made based on the tracked eye direction.

Based on the determination that the first XR device 602 is pointed (or that the first user is looking) at the second XR device 604, the first XR device 602 may determine that the second XR device 604 is a target for the data transfer. Based on the determination that the second XR device 604 is the target for the data transfer, the first XR device 602 may, at step 618, transmit an indication to the second XR device 504 to initiate the data transfer (e.g., data transfer request) in response to the request to initiate the data transfer to another XR device received at step 614.

The second XR device 604 may then receive the indication to initiate the data transfer and based on the indication to initiate the data transfer, the second XR device 604 may, at step 620, display, for example on a UI of the second XR device 604, an indication that a data transfer request has been received. In some cases, this indication may indicate which device (e.g., the first XR device 602) the request was received from (or a user associated with the device). In some cases, the indication may also indicate a direction in which the device (e.g., the first XR device 602) is located.

If the second XR device 604, at step 622, is then pointed back toward the first XR device 602, the data transfer may be confirmed. For example, if a user of the second XR device 604 moves (e.g., to point the second XR device 604 toward the first XR device 602), the second XR device 604 may determine whether the second XR device 604 is pointed toward the first XR device 602 in a manner similar to that described above with respect to the first XR device 602. In some cases, if the second XR device 604 is pointed toward the first XR device 602, the second XR device 604, at step 624, may transmit localization and pose information for the second XR device 604 to the first XR device 602. The first XR device 602 may, receive the localization and pose information for the second XR device 604 and, at step 626, compare the localization and/or pose information with the common feature map 606 to verify that the second XR device 604 is pointed back at the first XR device 602. In some cases, a determination that the second XR device is pointed back at the first XR device 602 may be made in a manner substantially similar to how the first XR device 602, at step 616, may determine whether the first XR device 602 is pointing at another device. In some cases, the second XR device 604 may not need to be pointed exactly at the first XR device 602 for the determination that the second XR device 604 is pointed back at the first XR device 602 to be made, rather the second XR device 604 may be pointed at some area around the first XR device 602. In some cases, the determination that the second XR device 604 is pointed at the first XR device 602 may be made if the second XR device 604 is pointed at the first XR device 602 for more than a threshold amount of time. If the first XR device 602 verifies that the second XR device 604 is pointed back at the first XR device 602, the first XR device, at step 628, may start the data transfer. In some cases, the data transfer may occur via any protocol, such as a direct device to device transfer, peer-to-peer protocol, via a server, etc.

Figure 7:
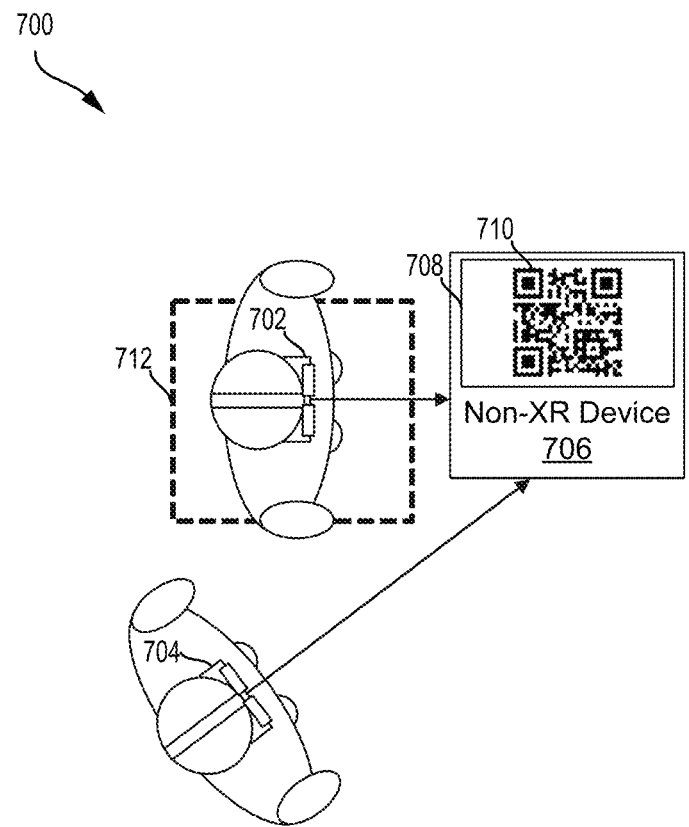
FIG. 7 illustrates a technique for private data sharing between an XR system and non-XR systems, in accordance with aspects of the present disclosure.

FIG. 7 illustrates a technique for private data sharing between an XR system and non-XR systems 700, in accordance with aspects of the present disclosure. FIG. 7 includes a first XR device 702 that is being worn by a first user, a second XR device 704 that is being worn by a second user, and a non-XR device 706. The non-XR device 706 may be any device that is not performing functionality typically found on an XR device such as pose detection/tracking and localization. Examples of non-XR device 706 may include kiosk devices, computer terminals, point of sale terminals, relatively low power devices, XR devices with XR functionality disabled and/or not being used, and the like. In some cases, the non-XR device 706 may not be participating in an XR session with the first XR device 702 and/or the second XR device 704. The non-XR device 706 may display, such as via a display 708, hard copy, etc., a visual code 710 indicating the non-XR device 706 can receive data transfers. A visual code 710 may be a method of encoding data into a machine readable and machine visible format. Examples of the visual code 710 may include bar codes, quick response (QR) codes, unique images, and the like. In some cases, these visual codes may not be visible to a human eye. For example, a QR code may be placed using pigments that are only visible in infrared/near infrared, which may be visible to some sensors of the XR system, but not to the human eye. These visual codes may be detected by the XR system and used to load websites or access other information. While QR codes are discussed herein as an example of visual codes, it should be understood the techniques discussed herein are applicable to any type of visual code. The visual code 710 displayed by (or around) the non-XR device 706 may indicate that non-XR device 706 can receive data transfers. For example, the visual code 710 may encode a universal resource locator (URL) which is an address where a data transfer may be performed.

In some cases, an XR system may detect and decode encoded information placed in the real environment such as visual codes. For example, the first XR device 702 may be pointed toward the visual code 710 displayed by the non-XR device 706. The first XR device 702 may detect the visual code 710 and based on the visual code 710, determine that a data transfer may be performed with the non-XR device 706. For example, the first XR device 702 may obtain images of the environment and attempt to detect visual codes in those images. After detecting the visual code 710, the first XR device 702 may determine that the visual code 710) indicates that a data transfer may be performed (e.g., a data transfer is available) with the non-XR device 706, for example, through the URL of the visual code 710 and/or content at the linked address of the visual code 710. In some cases, other information about the data transfer may be encoded in the URL of the visual code 710 and/or content at the linked address of the visual code 710. For example, the information about the data transfer may indicate an address for the data transfer itself (e.g., data transfer address), an address to send location information to, what data will be transferred, data transfer protocol information, payment information (e.g., payment processor, amount), information about a data transfer zone, etc. In some cases, the URL of the visual code 710 may include an address to a webpage on which information about the data transfer may be found. In some cases, the visual code may be detected when the visual code is within a field of view of an image obtained by the first XR device 702.

In some cases, based on the determination that the visual code 710 indicates that a data transfer may be performed with the non-XR device 706, the first XR device 702 may initiate performance of the data transfer based on whether the first XR device is within a data transfer zone 712. For example, the first XR device 702 may determine its location and transit its location data to the non-XR device 706 (or a device associated with the non-XR device, such as a remote server) and the non-XR device 706 may begin a data transfer operation with the first XR device 702 after determining that the first XR device 702 is within the data transfer zone 712. The first XR device 702 may determine its location based on, for example, GNSS coordinates, based on a feature map of the environment, based on a common feature map, etc. The data transfer zone 712 may be a location in which the data transfer may be confirmed. Information about the data transfer zone for a device, such as the non-XR device 706, may be included in the visual code and/or a webpage linked by a URL of the visual code. The first XR device 702 may navigate to the webpage linked by the URL of the visual code to obtain the information about the data transfer zone by parsing the linked webpage. Information about the data transfer zone may include a location, size, shape, etc. of the data transfer zone. In some cases, the information about the data transfer zone may be based on features of the environment in which the data transfer zone is located in. For example, the information about the data transfer zone may define a location/size/shape of the data transfer zone based on features of the data transfer zone and environment around the data transfer zone that are in a common feature map of features in the environment. In other cases, the data transfer zone may be defined relative to global and/or local coordinate systems, such as a GNSS coordinates or relative to wireless beacons in the environment.

In some cases, the data transfer zone 712 is smaller than (e.g., a subregion of) a region in which the data transfer itself may occur. In some cases, the data transfer zone 712 may be associated with the non-XR device 706. For example, the data transfer zone may be defined as a part of setting up the non-XR device to perform data transfers. In some cases, the data transfer zone 712 may have a predefined size or a predefined minimum and/or maximum size (e.g., area/volume). In some cases, the data transfer zone 712 may have a predefined shape. In some cases, the data transfer zone 712 may be sized to accommodate a single person. In some cases, the data transfer zone may be fixed or dynamically defined based on, for example, a location of the non-XR device 706, a direction the non-XR device 706 is pointed, a position/location of the first XR device 702 (e.g., two feet in front of where the XR device is located) etc. The non-XR device 706 may also receive location information for the second XR device 704 and, based on a determination that the second XR device 704 is not within the data transfer zone 712, may not begin the data transfer operation with the second XR device 704.

Figure 8:
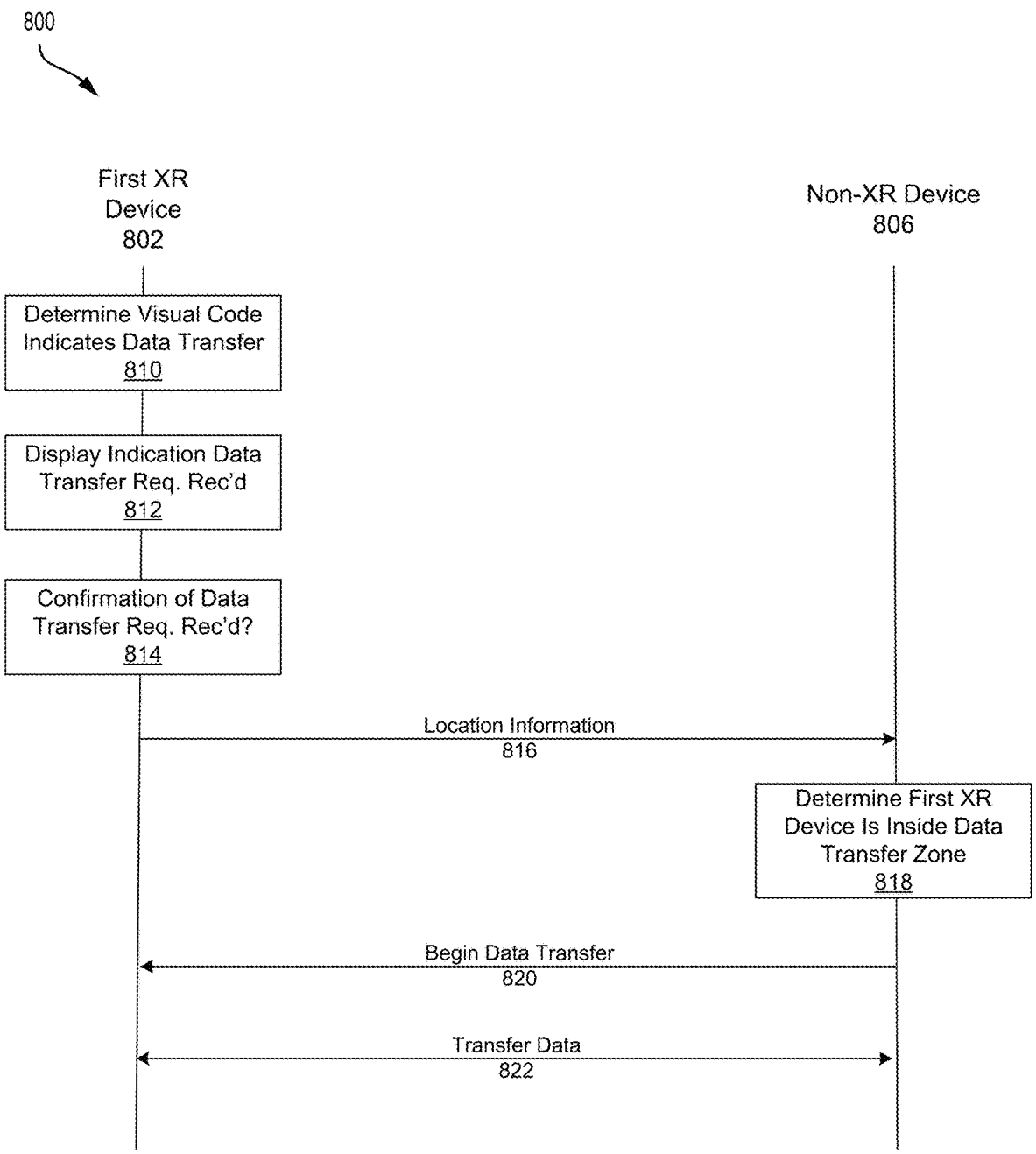
FIG. 8 is a data flow diagram illustrating messages exchanged for private data sharing between an XR system and non-XR systems, in accordance with aspects of the present disclosure.

FIG. 8 is a data flow diagram illustrating messages exchanged for private data sharing between an XR system and non-XR systems 800, in accordance with aspects of the present disclosure. FIG. 8 includes a first XR device 802 that is being worn by a first user and a non-XR device 806. In some cases, after the first XR device 802 determines, at step 810, that a visual code, such as visual code 710 of FIG. 7, indicates that a data transfer may be performed with the non-XR device 806, the first XR device 802 may, at step 812, display, for example on a UI of the first XR device 802, an indication that a data transfer request has been received. In some cases, the indication may indicate which device (e.g., the non-XR device 806) the request was received from. In some cases, the indication that a data transfer request has been received may be displayed by the first XR device 802 if the first XR device 802 is pointed at the visual code. In some cases, the first XR device 802 may determine that it is pointed at the visual code in a manner substantially similar to that discussed above with respect to the first XR device 502 of FIG. 5 and the first XR device 602 of FIG. 6. In some cases, the indication that a data transfer request has been received may be displayed by the first XR device 802 if the first XR device 802 is pointed at the visual code longer than a threshold period of time. In some cases, the indication that a data transfer request has been received may also include an indication of a data transfer zone (e.g., data transfer zone 712 of FIG. 7). For example, the data transfer zone may be displayed by the first XR device, as a virtual object (e.g., an outline) in a view of the environment which identifies a certain area of the environment.

In some cases, after the first XR device 702 determines that the visual code 710 indicates that a data transfer may be performed with the non-XR device 706, the first XR device 702 may, at step 816, transmit its location information to the non-XR device 706. In some cases, the first XR device 702 may transmit its location information based on a confirmation received, at step 814, in response to the indication that a data transfer request has been received. For example, the indication that a data transfer request has been received may be a dialog box indicating that a data transfer request has been received and whether to perform the data transfer request. If an indication to perform the data transfer is received, for example by the first XR device 802 from the first user, the first XR device 802 may begin sending, at step 816, location information for the first XR device 802 to the non-XR device 806 (or a device associated with the non-XR device, such as a remote server). In some cases, the first XR device 802 may transmit, at step 816, its location information if the first XR device 802 is moved within the data transfer zone. In some cases, the first XR device 802 may send the location information to an address indicated by the visual code and/or content at a linked address of the visual code. In some cases, the location information may be based on localization information. For example, localization information may be used to supplement other information, such as location information inferred from one or more signals from wireless beacons, one or more signals from one or more satellites associated with one or more Global Navigation Satellite System (GNSS) systems, and the like. In some cases, the location information may be the localization information.

In some cases, the non-XR device 806 (or a device associated with the non-XR device) may receive the location information for the first XR device 802 and the non-XR device 806 (or a device associated with the non-XR device) may, at step 818, determine, based on the received location information, whether the first XR device 802 is within the data transfer zone. If the first XR device 802 is within the data transfer zone, the data transfer may begin. For example, the non-XR device 806 may send a request to begin the data transfer (or the data to be transferred) and the first XR device 802 may begin the data transfer.

Figure 9:
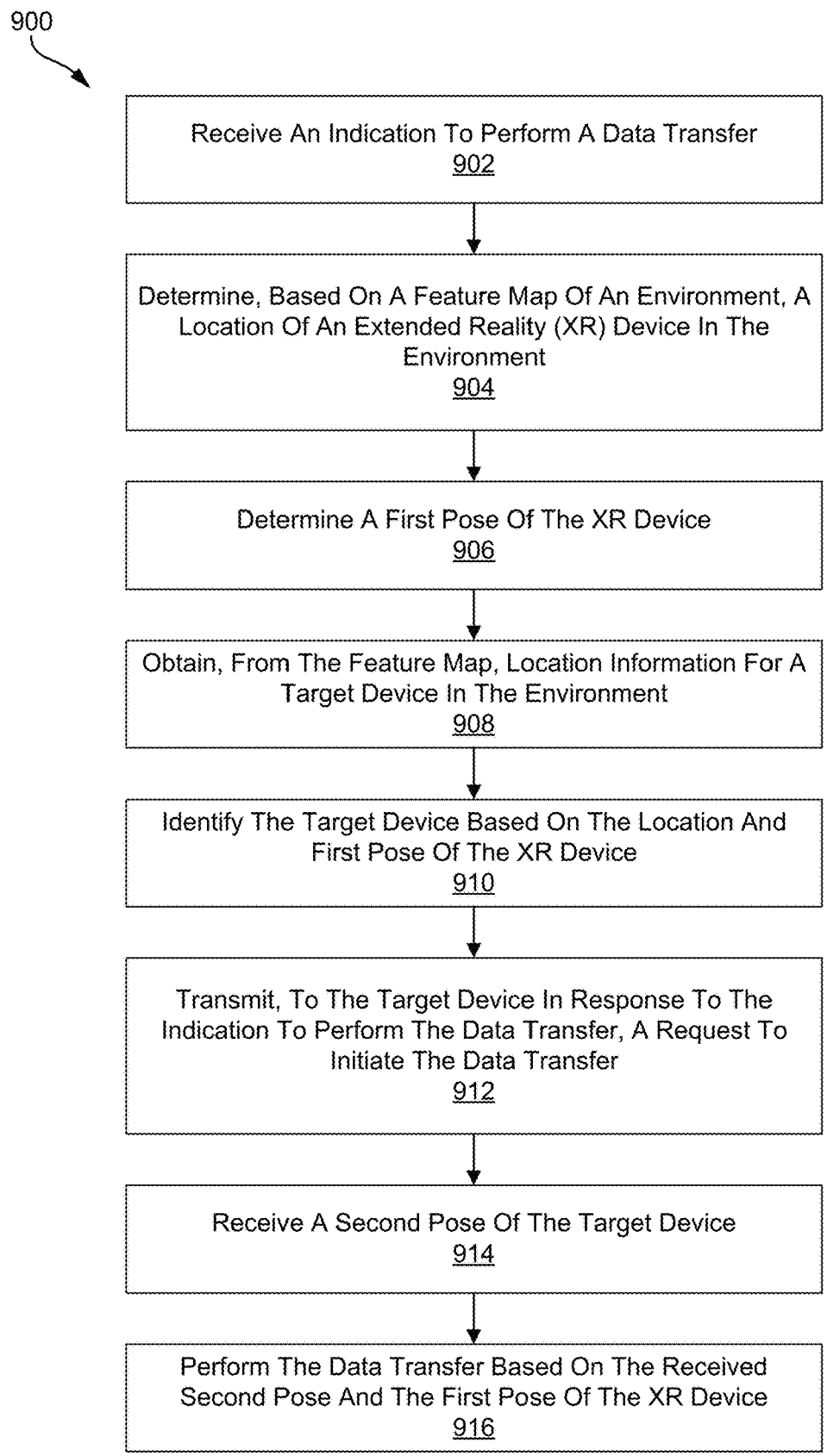
FIG. 9 is a flow diagram illustrating a process for data transfer, in accordance with aspects of the present disclosure.

FIG. 9 is a flow diagram illustrating a process 900 for data transfer, in accordance with aspects of the present disclosure. The process 900 may be performed by a computing device (or apparatus) or a component (e.g., a chipset, codec, extended reality engine 220, communications engine 228, image processing engine 224 of FIG. 2, augmented reality enhanced application engine 400 of FIG. 4, processor 1310 of FIG. 13, etc.) of the computing device. The computing device may be a mobile device (e.g., a mobile phone, mobile device 1250 of FIG. 12A/12B, and the like), a network-connected wearable such as a watch, an extended reality (XR) device such as a virtual reality (VR) device or augmented reality (AR) device (e.g., image capture and processing system 100 of FIG. 1, XR system 200 of FIG. 2, SLAM system 300 of FIG. 3, HMD 1110 of FIG. 11A/10B, and the like), a vehicle or component or system of a vehicle, or other type of computing device (e.g., computing system 1300 of FIG. 13). The operations of the process 900 may be implemented as software components that are executed and run on one or more processors (e.g., image processor 150, host processor 152 of FIG. 1, compute components 210 of FIG. 2, processor 1310 of FIG. 13, and the like). In some cases, the operations of the process 900 can be implemented by a system having the architecture 1300 of FIG. 13.

At block 902, the computing device (or component thereof) may receive an indication to perform a data transfer. For example, a first device may receive an input to a UI of the first device requesting initiating a data transfer to another device (e.g., an indication to perform a data transfer). In some cases, the device comprises at least one of a headset, hand controller, or portable device.

At block 904, the computing device (or component thereof) may determine, based on a feature map of an environment, a location of the device in the environment. For example, the device may compare features detected in images of the environment with features in the feature map to determine the device's location and pose. In some cases, the feature map comprises a common feature map accessible to the device and the target device.

At block 906, the computing device (or component thereof) may determine a first pose of the device. For example, the computing device may obtain 6DoF pose measurements to determine the pose of the device. In some cases, the pose of the device may be the position and orientation of the device relative to a frame of reference.

At block 908, the computing device (or component thereof) may obtain, from the feature map, location information for a target device in the environment. For example, the device may perform feature tracking and/or another localization and mapping process to locate itself in an environment based on a feature map. In some cases, this feature map may be a common feature map shared by multiple devices and the device may compare features detected in images of the environment with features in the feature map to determine the device's location and pose. In some cases, the computing device (or component thereof) may obtain an image of the environment; identify one or more features of the environment from the image; and compare the identified one or more features of the environment to features of the feature map.

At block 910, the computing device (or component thereof) may identify the target device based on the location and the first pose of the device. For example, the first device may extrapolate in a forward direction, in the common feature map, based on the pose and location of the first device to determine if the first device is pointed at another device in front of the first device. In some cases, the target device is identified by extrapolating from the location of the device based on the first pose of the device using the common feature map to determine that the device is pointed at the target device.

At block 912, the computing device (or component thereof) may transmit, to the target device in response to the indication to perform the data transfer, a request to initiate the data transfer. For example, the device may transmit an indication to the second device to initiate the data transfer (e.g., data transfer request).

At block 914, the computing device (or component thereof) may receive a second pose of the target device. For example, the second device may transmit it's pose information to the first device. In some case, the computing device (or component thereof) may determine, based on the first pose of the device and the second pose of the target device, that the device and the target device are pointed at each other to enable communication between the device and the target device, wherein the data transfer is performed based on the determination that the device and the target device are pointed at each other. In some cases, the device and the target device are pointed at each other for a duration that is more than a threshold amount of time. In some cases, the computing device (or component thereof) may receive localization information from the target device and determine that the target device is pointed at the device by extrapolating from the localization information based on the second pose of the target device using the common feature map.

At block 916, the computing device (or component thereof) may perform the data transfer based on the received second pose and the first pose of the device. For example, the device may compare the pose information to verify that the second device is pointed back at the first device.

Figure 10:
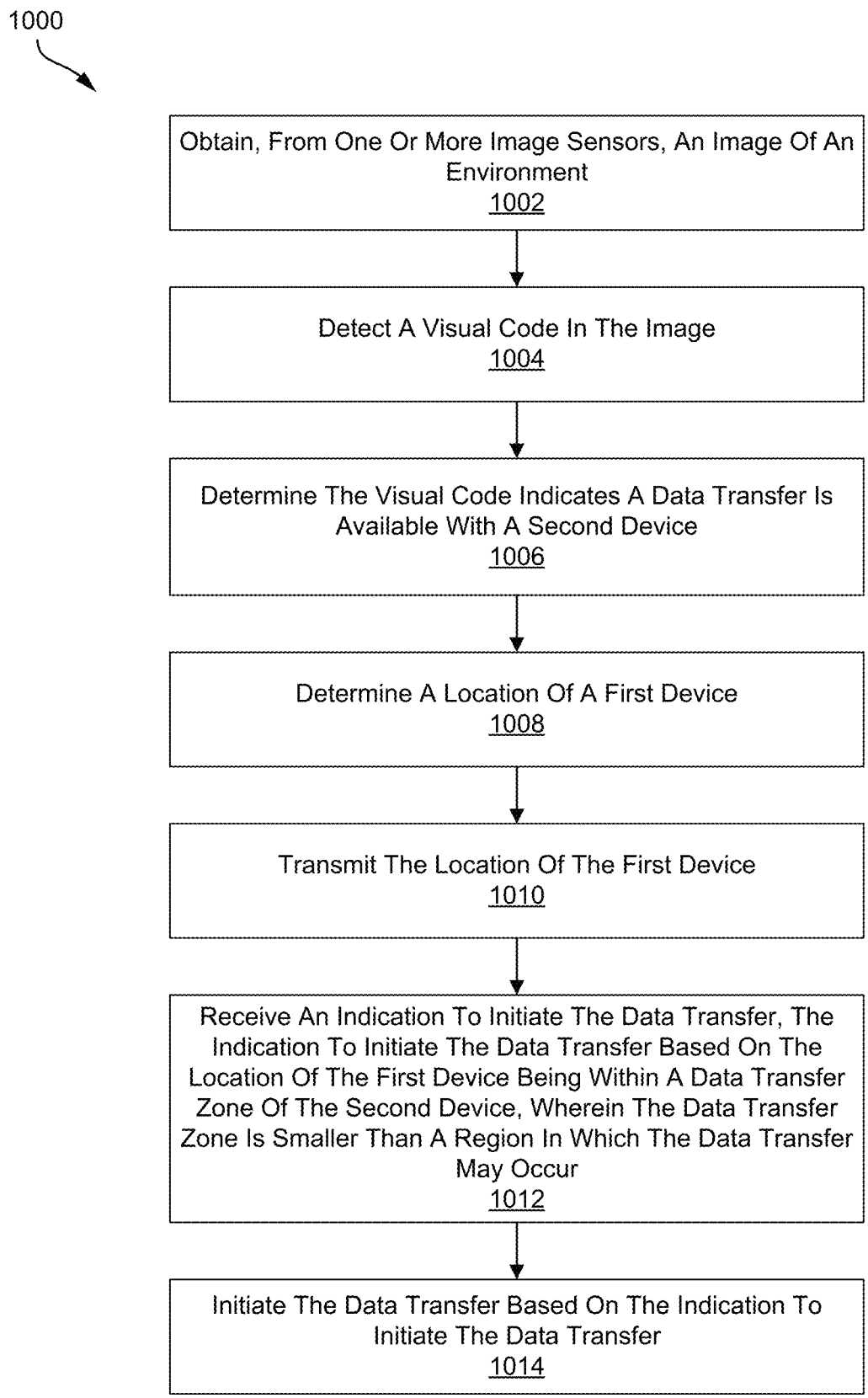
FIG. 10 is a flow diagram illustrating a process for data transfer, in accordance with aspects of the present disclosure.

FIG. 10 is a flow diagram illustrating a process 1000 for data transfer, in accordance with aspects of the present disclosure. The process 1000 may be performed by a computing device (or apparatus) or a component (e.g., a chipset, codec, extended reality engine 220, communications engine 228, image processing engine 224 of FIG. 2, augmented reality enhanced application engine 400 of FIG. 4, processor 1310 of FIG. 13, etc.) of the computing device. The computing device may be a mobile device (e.g., a mobile phone, mobile device 1250 of FIG. 12A/12B, and the like), a network-connected wearable such as a watch, an extended reality (XR) device such as a virtual reality (VR) device or augmented reality (AR) device (e.g., image capture and processing system 100 of FIG. 1, XR system 200 of FIG. 2, SLAM system 300 of FIG. 3, HMD 1110 of FIG. 11A/11B, and the like), a vehicle or component or system of a vehicle, or other type of computing device (e.g., computing system 1300 of FIG. 13). The operations of the process 1000 may be implemented as software components that are executed and run on one or more processors (e.g., image processor 150, host processor 152 of FIG. 1, compute components 210 of FIG. 2, processor 1310 of FIG. 13, and the like). In some cases, the operations of the process 1000 can be implemented by a system having the architecture 1300 of FIG. 13.

At block 1002, the computing device (or component thereof) may obtain, from one or more image sensors (e.g., image sensor 130 of FIG. 1, image sensor 202 of FIG. 2, camera 310 of FIG. 3, first camera 1130A and second camera 1130B of FIGS. 11A and 11B, cameras 1230A-B and cameras 1230C-D of FIGS. 12A-12B, etc.), an image of an environment. In some cases, the first device comprises an extended reality (XR) device, headset, hand controller, or portable device.

At block 1004, the computing device (or component thereof) may detect a visual code (e.g., visual code 710 of FIG. 7) in the image.

At block 1006, the computing device (or component thereof) may determine the visual code indicates a data transfer is available with a second device. For example, the visual code may encode a universal resource locator (URL) which is an address where a data transfer may be performed. In some cases, the visual code encodes a universal resource locator (URL) indicating that the data transfer may be performed. In some cases, the computing device (or component thereof) may determine that the visual code indicates the data transfer is available based on the URL. In some examples, the computing device (or component thereof) may perform at least one of: obtain information about the data transfer zone based on the URL, or obtain information about the data transfer based on the URL.

At block 1008, the computing device (or component thereof) may determine a location of the first device. For example, the device may determine its location based on, for example, GNSS coordinates, based on a feature map of the environment, based on a common feature map, etc.

At block 1010, the computing device (or component thereof) may transmit the location of the first device. For example, the device may begin sending location information (e.g., at step 816 of FIG. 8) for the first device to the second device (or another device associated with the second device, such as a remote server). In some cases, the location of the first device is transmitted to the second device for comparison to a location of the data transfer zone. In some examples, the computing device (or component thereof) may determine the location of a first device by identifying one or more features of the environment from the image of the environment; and comparing the identified one or more features of the environment to features of a feature map.

At block 1012, the computing device (or component thereof) may receive an indication to initiate the data transfer, the indication to initiate the data transfer based on the location of the first device being within a data transfer zone of the second device, wherein the data transfer zone is smaller than a region in which the data transfer may occur. For example, the second device may receive the location information for the first device and the second device (or a device associated with the non-XR device) may determine, based on the received location information, whether the first device is within a data transfer zone. If the first XR device is within the data transfer zone, the second device may send a request to begin the data transfer. In some cases, the information about the data transfer zone includes at least one of a location, size, or shape of the data transfer zone. In some examples, the information about the data transfer includes at least one of: a data transfer address; an address to transmit the location to; data for transfer; data transfer protocol information; or payment information. In some cases, the information about the data transfer includes an address to transmit the location of the first device to, and wherein the location of the first device is transmitted to a third device associated with the second device for comparison to a location of the data transfer zone. In some cases, the data transfer zone has a predefined shape or a predefined size.

At block 1014, the computing device (or component thereof) may initiate the data transfer based on the indication to initiate the data transfer.

Figure 11A:
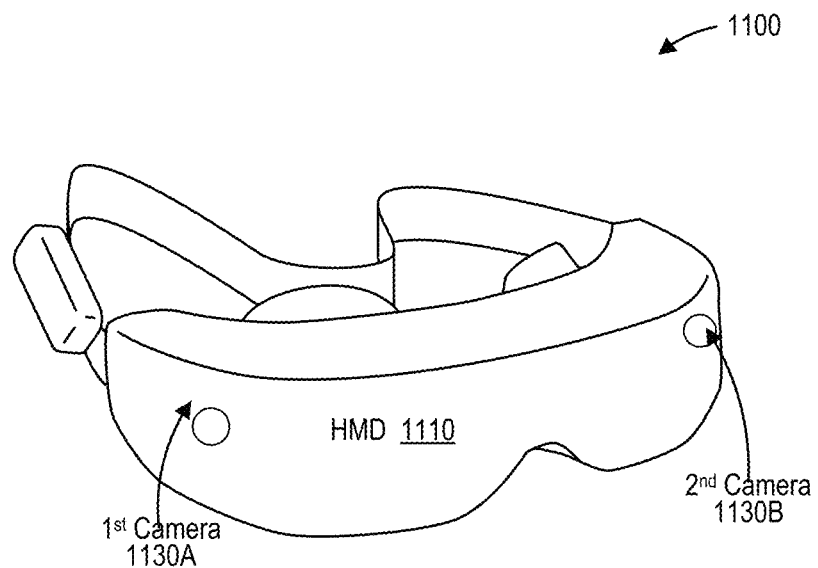
FIG. 11A is a perspective diagram illustrating a head-mounted display (HMD) that performs feature tracking and/or visual simultaneous localization and mapping (VSLAM), in accordance with some examples.

FIG. 11A is a perspective diagram 1100 illustrating a head-mounted display (HMD) 1110 that performs feature tracking and/or visual simultaneous localization and mapping (VSLAM), in accordance with some examples. The HMD 1110 may be, for example, an augmented reality (AR) headset, a virtual reality (VR) headset, a mixed reality (MR) headset, an extended reality (XR) headset, or some combination thereof. The HMD 1110 may be an example of an XR system 200, a SLAM system 300, or a combination thereof. The HMD 1110 includes a first camera 1130A and a second camera 1130B along a front portion of the HMD 1110. The first camera 1130A and the second camera 1130B may be two of the one or more cameras 310. In some cases, the HMD 1110 may also include a third camera (not visible), fourth camera (not visible), fifth camera (not visible), and sixth camera (not visible). In some cases, the third camera (not visible), fourth camera (not visible), fifth camera (not visible), and sixth camera (not visible) may be four of the one or more cameras 310. In some examples, the HMD 1110 may include one or more additional cameras in addition to the first camera 1130A and the second camera 1130B. In some examples, the HMD 1110 may include one or more additional sensors in addition to the first camera 1130A and the second camera 1130B.

Figure 11B:
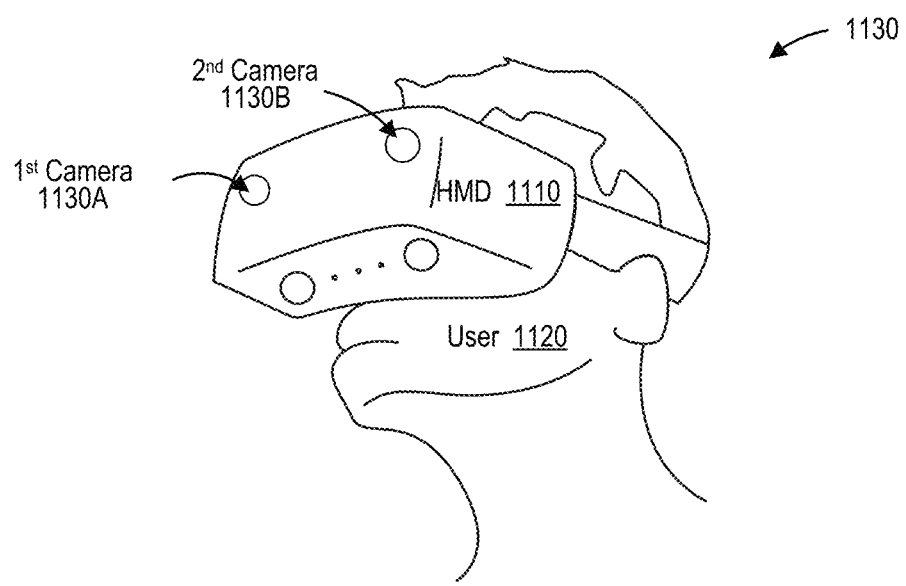
FIG. 11B is a perspective diagram illustrating the head-mounted display (HMD) of FIG. 11A being worn by a user, in accordance with some examples.

FIG. 11B is a perspective diagram 1130 illustrating the head-mounted display (HMD) 1110 of FIG. 11A being worn by a user 1120, in accordance with some examples. The user 1120 wears the HMD 1110 on the user 1120's head over the user 1120's eyes. The HMD 1110 can capture images with the first camera 1130A and the second camera 1130B. In some examples, the HMD 1110 displays one or more display images toward the user 1120's eyes that are based on the images captured by the first camera 1130A and the second camera 1130B. The display images may provide a stereoscopic view of the environment, in some cases with information overlaid and/or with other modifications. For example, the HMD 1110 can display a first display image to the user 1120's right eye, the first display image based on an image captured by the first camera 1130A. The HMD 1110 can display a second display image to the user 1120's left eye, the second display image based on an image captured by the second camera 1130B. For instance, the HMD 1110 may provide overlaid information in the display images overlaid over the images captured by the first camera 1130A and the second camera 1130B. As indicated above, the HMD 1110 may also include a fifth camera (not visible) and sixth camera (not visible). In some cases, the third camera (not visible), fourth camera (not visible), fifth camera (not visible) and sixth camera (not visible) may be used primarily for tracking and mapping and images captured by these cameras may not typically be displayed to the user 1120.

The HMD 1110 includes no wheels, propellers or other conveyance of its own. Instead, the HMD 1110 relies on the movements of the user 1120 to move the HMD 1110 about the environment. Thus, in some cases, the HMD 1110, when performing a SLAM technique, can skip path planning using a path planning engine and/or movement actuation using the movement actuator. In some cases, the HMD 1110 can still perform path planning using a path planning engine, and can indicate directions to follow a suggested path to the user 1120 to direct the user along the suggested path planned using the path planning engine. In some cases, for instance where the HMD 1110 is a VR headset, the environment may be entirely or partially virtual. If the environment is at least partially virtual, then movement through the virtual environment may be virtual as well. For instance, movement through the virtual environment can be controlled by an input device 208. The movement actuator may include any such input device 208. Movement through the virtual environment may not require wheels, propellers, legs, or any other form of conveyance. If the environment is a virtual environment, then the HMD 1110 can still perform path planning using the path planning engine and/or movement actuation. If the environment is a virtual environment, the HMD 1110 can perform movement actuation using the movement actuator by performing a virtual movement within the virtual environment. Even if an environment is virtual, SLAM techniques may still be valuable, as the virtual environment can be unmapped and/or may have been generated by a device other than the HMD 1110, such as a remote server or console associated with a video game or video game platform. In some cases, feature tracking and/or SLAM may be performed in a virtual environment even by vehicle or other device that has its own physical conveyance system that allows it to physically move about a physical environment. For example, SLAM may be performed in a virtual environment to test whether a SLAM system 300 is working properly without wasting time or energy on movement and without wearing out a physical conveyance system.

Figure 12A:
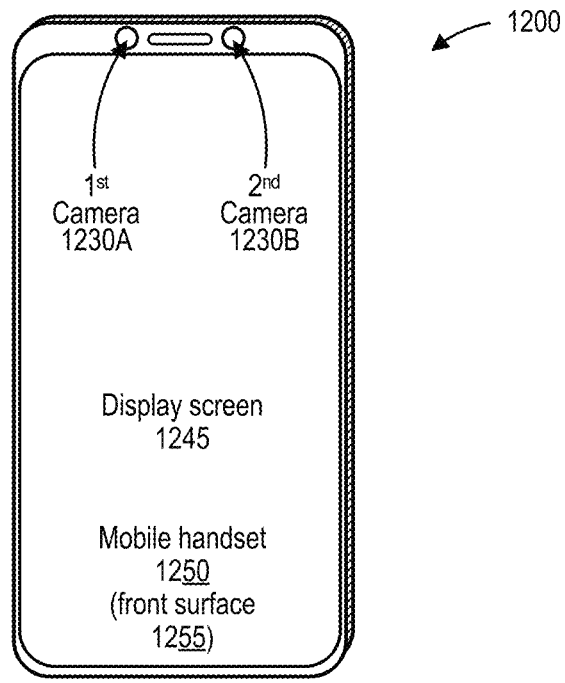
FIG. 12A is a perspective diagram illustrating a front surface of a mobile device that performs feature tracking and/or visual simultaneous localization and mapping (VSLAM) using one or more front-facing cameras, in accordance with some examples.

FIG. 12A is a perspective diagram 1200 illustrating a front surface 1255 of a mobile device 1250 that performs feature tracking and/or visual simultaneous localization and mapping (VSLAM) using one or more front-facing cameras 1230A-B, in accordance with some examples. The mobile device 1250 may be, for example, a cellular telephone, a satellite phone, a portable gaming console, a music player, a health tracking device, a wearable device, a wireless communication device, a laptop, a mobile device, any other type of computing device or computing system 1300 discussed herein, or a combination thereof. The front surface 1255 of the mobile device 1250 includes a display screen 1245. The front surface 1255 of the mobile device 1250 includes a first camera 1230A and a second camera 1230B. The first camera 1230A and the second camera 1230B are illustrated in a bezel around the display screen 1245 on the front surface 1255 of the mobile device 1250. In some examples, the first camera 1230A and the second camera 1230B can be positioned in a notch or cutout that is cut out from the display screen 1245 on the front surface 1255 of the mobile device 1250. In some examples, the first camera 1230A and the second camera 1230B can be under-display cameras that are positioned between the display screen 1245 and the rest of the mobile device 1250, so that light passes through a portion of the display screen 1245 before reaching the first camera 1230A and the second camera 1230B. The first camera 1230A and the second camera 1230B of the perspective diagram 1200 are front-facing cameras. The first camera 1230A and the second camera 1230B face a direction perpendicular to a planar surface of the front surface 1255 of the mobile device 1250. The first camera 1230A and the second camera 1230B may be two of the one or more cameras 310. In some examples, the front surface 1255 of the mobile device 1250 may only have a single camera. In some examples, the mobile device 1250 may include one or more additional cameras in addition to the first camera 1230A and the second camera 1230B. In some examples, the mobile device 1250 may include one or more additional sensors in addition to the first camera 1230A and the second camera 1230B.

Figure 12B:
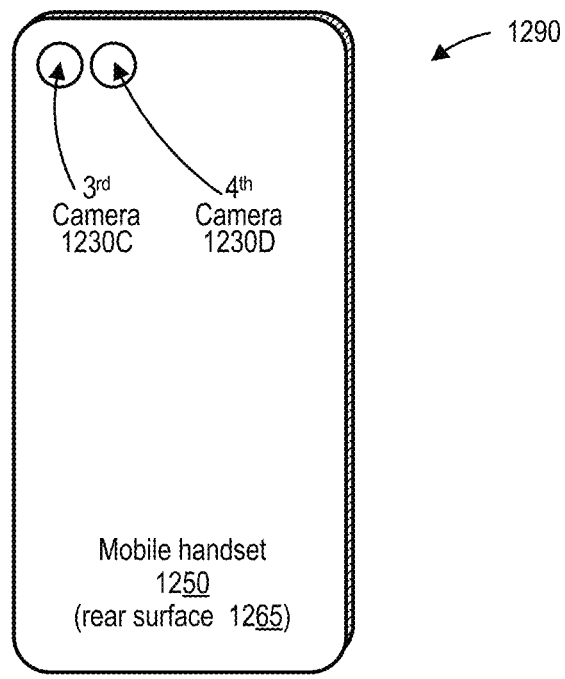
FIG. 12B is a perspective diagram illustrating a rear surface of a mobile device, in accordance with aspects of the present disclosure.

FIG. 12B is a perspective diagram 1290 illustrating a rear surface 1265 of a mobile device 1250. The mobile device 1250 includes a third camera 1230C and a fourth camera 1230D on the rear surface 1265 of the mobile device 1250. The third camera 1230C and the fourth camera 1230D of the perspective diagram 1290 are rear-facing. The third camera 1230C and the fourth camera 1230D face a direction perpendicular to a planar surface of the rear surface 1265 of the mobile device 1250. While the rear surface 1265 of the mobile device 1250 does not have a display screen 1245 as illustrated in the perspective diagram 1290, in some examples, the rear surface 1265 of the mobile device 1250 may have a second display screen. If the rear surface 1265 of the mobile device 1250 has a display screen 1245, any positioning of the third camera 1230C and the fourth camera 1230D relative to the display screen 1245 may be used as discussed with respect to the first camera 1230A and the second camera 1230B at the front surface 1255 of the mobile device 1250. The third camera 1230C and the fourth camera 1230D may be two of the one or more cameras 310. In some examples, the rear surface 1265 of the mobile device 1250 may only have a single camera. In some examples, the mobile device 1250 may include one or more additional cameras in addition to the first camera 1230A, the second camera 1230B, the third camera 1230C, and the fourth camera 1230D. In some examples, the mobile device 1250 may include one or more additional sensors in addition to the first camera 1230A, the second camera 1230B, the third camera 1230C, and the fourth camera 1230D.

Like the HMD 1110, the mobile device 1250 includes no wheels, propellers, or other conveyance of its own. Instead, the mobile device 1250 relies on the movements of a user holding or wearing the mobile device 1250 to move the mobile device 1250 about the environment. Thus, in some cases, the mobile device 1250, when performing a SLAM technique, can skip path planning using the path planning engine and/or movement actuation using the movement actuator. In some cases, the mobile device 1250 can still perform path planning using the path planning engine, and can indicate directions to follow a suggested path to the user to direct the user along the suggested path planned using the path planning engine. In some cases, for instance where the mobile device 1250 is used for AR, VR, MR, or XR, the environment may be entirely or partially virtual. In some cases, the mobile device 1250 may be slotted into a head-mounted device (HMD) (e.g., into a cradle of the HMD) so that the mobile device 1250 functions as a display of the HMD, with the display screen 1245 of the mobile device 1250 functioning as the display of the HMD. If the environment is at least partially virtual, then movement through the virtual environment may be virtual as well. For instance, movement through the virtual environment can be controlled by one or more joysticks, buttons, video game controllers, mice, keyboards, trackpads, and/or other input devices that are coupled in a wired or wireless fashion to the mobile device 1250. The movement actuator may include any such input device. Movement through the virtual environment may not require wheels, propellers, legs, or any other form of conveyance. If the environment is a virtual environment, then the mobile device 1250 can still perform path planning using the path planning engine and/or movement actuation. If the environment is a virtual environment, the mobile device 1250 can perform movement actuation using the movement actuator by performing a virtual movement within the virtual environment FIG. 13 is a diagram illustrating an example of a system for implementing certain aspects of the present technology. In particular, FIG. 13 illustrates an example of computing system 1300, which can be for example any computing device making up internal computing system, a remote computing system, a camera, or any component thereof in which the components of the system are in communication with each other using connection 1305. Connection 1305 can be a physical connection using a bus, or a direct connection into processor 1310, such as in a chipset architecture. Connection 1305 can also be a virtual connection, networked connection, or logical connection.

In some examples, computing system 1300 is a distributed system in which the functions described in this disclosure can be distributed within a datacenter, multiple data centers, a peer network, etc. In some examples, one or more of the described system components represents many such components each performing some or all of the functions for which the component is described. In some cases, the components can be physical or virtual devices.

Example system 1300 includes at least one processing unit (CPU or processor) 1310 and connection 1305 that couples various system components including system memory 1315, such as read-only memory (ROM) 1320 and random access memory (RAM) 1325 to processor 1310. Computing system 1300 can include a cache 1312 of high-speed memory connected directly with, in close proximity to, or integrated as part of processor 1310.

Processor 1310 can include any general purpose processor and a hardware service or software service, such as services 1332, 1334, and 1336 stored in storage device 1330, configured to control processor 1310 as well as a special-purpose processor where software instructions are incorporated into the actual processor design. Processor 1310 may be a completely self-contained computing system, containing multiple cores or processors, a bus, memory controller, cache, etc. A multi-core processor may be symmetric or asymmetric.

To enable user interaction, computing system 1300 includes an input device 1345, which can represent any number of input mechanisms, such as a microphone for speech, a touch-sensitive screen for gesture or graphical input, keyboard, mouse, motion input, speech, etc. Computing system 1300 can also include output device 1335, which can be one or more of a number of output mechanisms. In some instances, multimodal systems can enable a user to provide multiple types of input/output to communicate with computing system 1300. Computing system 1300 can include communications interface 1340, which can generally govern and manage the user input and system output. The communication interface may perform or facilitate receipt and/or transmission of wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1340 may also include one or more Global Navigation Satellite System (GNSS) receivers or transceivers that are used to determine a location of the computing system 1300 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1330 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 1330 can include software services, servers, services, etc., that when the code that defines such software is executed by the processor 1310, it causes the system to perform a function. In some examples, a hardware service that performs a particular function can include the software component stored in a computer-readable medium in connection with the necessary hardware components, such as processor 1310, connection 1305, output device 1335, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some examples, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the examples provided herein. However, it will be understood by one of ordinary skill in the art that the examples may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the examples in unnecessary detail. In other instances, well-known circuits, processes, algorithms, structures, and techniques may be shown without unnecessary detail in order to avoid obscuring the examples.

Individual examples may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific examples thereof, but those skilled in the art will recognize that the application is not limited thereto. Thus, while illustrative examples of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, examples can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate examples, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B. and can additionally include items not listed in the set of A and B.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Claim language or other language reciting "at least one processor configured to," "at least one processor being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

Illustrative aspects of the present disclosure include:

Aspect 1. A method for data transfer, comprising: receiving an indication to perform a data transfer; determining, based on a feature map of an environment, a location of an extended reality (XR) device in the environment; determining a first pose of the XR device; obtaining, from the feature map, location information for a target device in the environment; identifying the target device based on the location and the first pose of the XR device; transmitting, to the target device in response to the indication to perform the data transfer, a request to initiate the data transfer; receiving a second pose of the target device; and performing the data transfer based on the received second pose and the first pose of the XR device.

Aspect 2. The method of Aspect 1, further comprising determining, based on the first pose of the XR device and the second pose of the target device, that the XR device and the target device are pointed at each other to enable communication between the XR device and the target device, wherein the data transfer is performed based on the determination that the XR device and the target device are pointed at each other.

Aspect 3. The method of Aspect 2, wherein the XR device and the target device are pointed at each other for a duration that is more than a threshold amount of time.

Aspect 4. The method of any of Aspects 1-3, wherein the feature map comprises a common feature map accessible to the XR device and the target device.

Aspect 5. The method of Aspect 4, wherein the target device is identified by extrapolating from the location of the XR device based on the first pose of the XR device using the common feature map to determine that the XR device is pointed at the target device.

Aspect 6. The method of Aspect 5, further comprising: receiving localization information from the target device; and determining that the target device is pointed at the XR device by extrapolating from the localization information based on the second pose of the target device using the common feature map.

Aspect 7. The method of any of Aspects 1-6, wherein determining the location of the XR device comprises: obtaining an image of the environment; identifying one or more features of the environment from the image; and comparing the identified one or more features of the environment to features of the feature map.

Aspect 8. The method of any of Aspects 1-7, wherein the XR device comprises at least one of a headset, hand controller, or portable device.

Aspect 9. A method for initiating a data transfer, comprising: obtaining, from one or more image sensors, an image of an environment; detecting a visual code in the image; determining the visual code indicates a data transfer is available with a second device; determining a location of a first device; transmitting the location of the first device; receiving an indication to initiate the data transfer, the indication to initiate the data transfer based on the location of the first device being within a data transfer zone of the second device, wherein the data transfer zone is smaller than a region in which the data transfer may occur; and initiating the data transfer based on the indication to initiate the data transfer.

Aspect 10. The method of Aspect 9 wherein the visual code encodes a universal resource locator (URL) indicating that the data transfer may be performed.

Aspect 11. The method of Aspect 10, wherein the determination that the visual code indicates the data transfer is available based on the URL.

Aspect 12. The method of any of Aspects 10-11, further comprising at least one of: obtaining information about the data transfer zone based on the URL, or obtaining information about the data transfer based on the URL.

Aspect 13. The method of Aspect 12, wherein the information about the data transfer zone includes at least one of a location, size, or shape of the data transfer zone.

Aspect 14. The method of any of Aspects 12-13, wherein the information about the data transfer includes at least one of: a data transfer address; an address to transmit the location to; data for transfer; data transfer protocol information; or payment information.

Aspect 15. The method of Aspect 14, wherein the information about the data transfer includes an address to transmit the location of the first device to, and wherein the location of the first device is transmitted to a third device associated with the second device for comparison to a location of the data transfer zone.

Aspect 16. The method of any of Aspects 11-15, wherein the data transfer zone has a predefined shape or a predefined size.

Aspect 17. The method of any of Aspects 9-16, wherein the location of the first device is transmitted to the second device for comparison to a location of the data transfer zone.

Aspect 18. The method of any of Aspects 9-17, wherein determining the location of a first device comprises: identifying one or more features of the environment from the image of the environment; and comparing the identified one or more features of the environment to features of a feature map.

Aspect 19. The method of any of Aspects 9-18, wherein the first device comprises an extended reality (XR) device, headset, hand controller, or portable device.

Aspect 20. An apparatus for data transfer by a device, comprising: at least one memory; and at least one processor coupled to the at least one memory and configured to: receive an indication to perform a data transfer; determine, based on a feature map of an environment, a location of the device in the environment; determine a first pose of the device; obtain, from the feature map, location information for a target device in the environment; identify the target device based on the location and the first pose of the device; transmit, to the target device in response to the indication to perform the data transfer, a request to initiate the data transfer; receive a second pose of the target device; and perform the data transfer based on the received second pose and the first pose of the device.

Aspect 21. The apparatus of Aspect 20, wherein the at least one processor is further configured to determine, based on the first pose of the device and the second pose of the target device, that the device and the target device are pointed at each other to enable communication between the device and the target device, wherein the data transfer is performed based on the determination that the device and the target device are pointed at each other.

Aspect 22. The apparatus of Aspect 21, wherein the device and the target device are pointed at each other for a duration that is more than a threshold amount of time.

Aspect 23. The apparatus of any of Aspects 20-22, wherein the feature map comprises a common feature map accessible to the device and the target device.

Aspect 24. The apparatus of Aspect 23, wherein the target device is identified by extrapolating from the location of the device based on the first pose of the device using the common feature map to determine that the device is pointed at the target device.

Aspect 25. The apparatus of Aspect 24, wherein the processor is further configured to: receive localization information from the target device; and determine that the target device is pointed at the device by extrapolating from the localization information based on the second pose of the target device using the common feature map.

Aspect 26. The apparatus of any of Aspects 20-25, wherein, to determine the location of the device, the at least one processor is configured to: obtain an image of the environment; identify one or more features of the environment from the image; and compare the identified one or more features of the environment to features of the feature map.

Aspect 27. The apparatus of any of Aspects 20-25, wherein the device comprises at least one of a headset, hand controller, or portable device.

Aspect 28. An apparatus for data transfer by a first device, comprising: at least one memory; and at least one processor coupled to the at least one memory and configured to: obtain, from one or more image sensors, an image of an environment; detect a visual code in the image; determine the visual code indicates a data transfer is available with a second device; determine a location of the first device; transmit the location of the first device; receive an indication to initiate the data transfer, the indication to initiate the data transfer based on the location of the first device being within a data transfer zone of the second device, wherein the data transfer zone is smaller than a region in which the data transfer may occur; and initiate the data transfer based on the indication to initiate the data transfer.

Aspect 29. The apparatus of Aspect 28 wherein the visual code encodes a universal resource locator (URL) indicating that the data transfer may be performed.

Aspect 30. The apparatus of Aspect 29, wherein the at least one processor is configured to determine that the visual code indicates the data transfer is available based on the URL.

Aspect 31. The apparatus of any of Aspects 29-30, wherein the at least one processor is configured to perform at least one of: obtain information about the data transfer zone based on the URL, or obtain information about the data transfer based on the URL.

Aspect 32. The apparatus of Aspect 31, wherein the information about the data transfer zone includes at least one of a location, size, or shape of the data transfer zone.

Aspect 33. The apparatus of any of Aspects 31-32, wherein the information about the data transfer includes at least one of: a data transfer address; an address to transmit the location to; data for transfer; data transfer protocol information; or payment information.

Aspect 34. The apparatus of Aspect 33, wherein the information about the data transfer includes an address to transmit the location of the first device to, and wherein the location of the first device is transmitted to a third device associated with the second device for comparison to a location of the data transfer zone.

Aspect 35. The apparatus of any of Aspects 30-34, wherein the data transfer zone has a predefined shape or a predefined size.

Aspect 36. The apparatus of any of Aspects 28-35, wherein the location of the first device is transmitted to the second device for comparison to a location of the data transfer zone.

Aspect 37. The apparatus of any of Aspects 28-36, wherein, to determine the location of a first device, the at least one processor is configured to: identify one or more features of the environment from the image of the environment; and compare the identified one or more features of the environment to features of a feature map.

Aspect 38. The apparatus of any of Aspects 28-37 wherein the first device comprises an extended reality (XR) device, headset, hand controller, or portable device.

Aspect 39. A non-transitory computer-readable medium having stored thereon instructions that, when executed by at least one processor, cause the at least one processor to perform operations according to any of Aspects 1-19

Aspect 40. An apparatus for data transfer comprising one or more means for performing operations according to any of Aspects 1-19.

What is claimed is:

1. A method for data transfer, comprising:
receiving an indication to perform a data transfer;
determining, based on a feature map of an environment, a location of an extended reality (XR) device in the environment;
determining a first pose of the XR device;
obtaining, from the feature map, location information for a target device in the environment;
identifying the target device, from the feature map, based on the location and the first pose of the XR device;
updating the feature map with the location and the first pose of the XR device;
transmitting, to the target device in response to the indication to perform the data transfer, a request to initiate the data transfer;
receiving a second pose of the target device; and
performing the data transfer between the XR device and the target device based on the received second pose and the first pose of the XR device and upon determination that the XR device and the target device are configured to perform the data transfer, wherein the determination that the XR device and the target device are configured for the data transfer includes comparing the location information of the target device and the second pose with the feature map to verify that the target device is located within a threshold distance from the XR device, and wherein the target device displays an indication of the data transfer request including identification information of the XR device and directionality of the XR device.

2. The method of claim 1, further comprising determining, based on the first pose of the XR device and the second pose of the target device, that the XR device and the target device are pointed at each other to enable communication between the XR device and the target device, wherein the data transfer is performed based on the determination that the XR device and the target device are pointed at each other.

3. The method of claim 2, wherein the XR device and the target device are pointed at each other for a duration that is more than a threshold amount of time.

4. The method of claim 1, wherein the feature map comprises a common feature map accessible to the XR device and the target device.

5. The method of claim 4, wherein the target device is identified by extrapolating from the location of the XR device based on the first pose of the XR device using the common feature map to determine that the XR device is pointed at the target device.

6. The method of claim 5, further comprising:
receiving localization information from the target device; and
determining that the target device is pointed at the XR device by extrapolating from the localization information based on the second pose of the target device using the common feature map.

7. The method of claim 1, wherein determining the location of the XR device comprises:
obtaining an image of the environment;
identifying one or more features of the environment from the image; and
comparing the identified one or more features of the environment to features of the feature map.

8. The method of claim 1, wherein the XR device comprises at least one of a headset, hand controller, or portable device.

9. A method for initiating a data transfer, comprising:
obtaining, from one or more image sensors, an image of an environment;
detecting a visual code in the image;
determining the visual code indicates a data transfer is available with a second device;
determining a location of a first device;
transmitting the location of the first device;
receiving an indication to initiate the data transfer, the indication to initiate the data transfer based on the location of the first device being within a data transfer zone of the second device, wherein the data transfer zone is smaller than a region in which the data transfer may occur; and
initiating the data transfer based on the indication to initiate the data transfer, wherein the visual code encodes a universal resource locator (URL) indicating that the data transfer can be performed.

10. The method of claim 9, wherein the determination that the visual code indicates the data transfer is available based on the URL.

11. The method of claim 9, further comprising at least one of:
obtaining information about the data transfer zone based on the URL, or
obtaining information about the data transfer based on the URL.

12. The method of claim 11, wherein the information about the data transfer zone includes at least one of a location, size, or shape of the data transfer zone.

13. The method of claim 11, wherein the information about the data transfer includes at least one of:
a data transfer address;
an address to transmit the location to;
data for transfer;
data transfer protocol information; or
payment information.

14. The method of claim 13, wherein the information about the data transfer includes an address to transmit the location of the first device to, and wherein the location of the first device is transmitted to a third device associated with the second device for comparison to a location of the data transfer zone.

15. The method of claim 10, wherein the data transfer zone has a predefined shape or a predefined size.

16. The method of claim 9, wherein the location of the first device is transmitted to the second device for comparison to a location of the data transfer zone.

17. The method of claim 9, wherein determining the location of a first device comprises:
identifying one or more features of the environment from the image of the environment; and
comparing the identified one or more features of the environment to features of a feature map.

18. The method of claim 9 wherein the first device comprises an extended reality (XR) device, headset, hand controller, or portable device.

19. An apparatus for data transfer by a device, comprising:
at least one memory; and
at least one processor coupled to the at least one memory and configured to:
receive an indication to perform a data transfer;
determine, based on a feature map of an environment, a location of the device in the environment;
determine a first pose of the device;
obtain, from the feature map, location information for a target device in the environment;
identify the target device, from the feature map, based on the location and the first pose of the device;
update the feature map with the location and the first pose of the device;
transmit, to the target device in response to the indication to perform the data transfer, a request to initiate the data transfer;
receive a second pose of the target device; and
perform the data transfer between the device and the target device based on the received second pose and the first pose of the device and upon determination that the device and the target device are configured to perform the data transfer, wherein the determination that the device and the target device are configured for the data transfer includes comparing the location information of the target device and the second pose with the feature map to verify that the target device is located within a threshold distance from the device, and wherein the target device displays an indication of the data transfer request including identification information of the device and directionality of the device.

20. The apparatus of claim 19, wherein the at least one processor is further configured to determine, based on the first pose of the device and the second pose of the target device, that the device and the target device are pointed at each other to enable communication between the device and the target device, wherein the data transfer is performed based on the determination that the device and the target device are pointed at each other.

21. The apparatus of claim 20, wherein the device and the target device are pointed at each other for a duration that is more than a threshold amount of time.

22. The apparatus of claim 19, wherein the feature map comprises a common feature map accessible to the device and the target device.

23. The apparatus of claim 22, wherein the target device is identified by extrapolating from the location of the device based on the first pose of the device using the common feature map to determine that the device is pointed at the target device.

24. The apparatus of claim 23, wherein the processor is further configured to:

receive localization information from the target device; and determine that the target device is pointed at the device by extrapolating from the localization information based on the second pose of the target device using the common feature map.

25. The apparatus of claim 19, wherein, to determine the location of the device, the at least one processor is configured to:

obtain an image of the environment;

identify one or more features of the environment from the image; and compare the identified one or more features of the environment to features of the feature map.

26. The apparatus of claim 19, wherein the device comprises at least one of a headset, hand controller, or portable device.

27. An apparatus for data transfer by a first device, comprising:

at least one memory; and at least one processor coupled to the at least one memory and configured to:

obtain, from one or more image sensors, an image of an environment;

detect a visual code in the image;

determine the visual code indicates a data transfer is available with a second device, wherein the visual code encodes a universal resource locator (URL) indicating that the data transfer can be performed;

determine a location of the first device;

transmit the location of the first device;

receive an indication to initiate the data transfer, the indication to initiate the data transfer based on the location of the first device being within a data transfer zone of the second device, wherein the data transfer zone is smaller than a region in which the data transfer may occur; and initiate the data transfer based on the indication to initiate the data transfer.

28. The apparatus of claim 27, wherein the at least one processor is configured to determine that the visual code indicates the data transfer is available based on the URL.

* * * * *